United States Patent
Walkingshaw et al.

(10) Patent No.: US 12,281,685 B2
(45) Date of Patent: Apr. 22, 2025

(54) STACKING FLYWHEEL AND LINKAGE

(71) Applicant: Torus Inc., Sandy, UT (US)

(72) Inventors: Nathan Walkingshaw, Sandy, UT (US); Calab Nelson, Springville, UT (US); John Loveless, Layton, UT (US); Zahra Derafshi, Cambridge, MA (US); Cliff Lambarth, Portage, MI (US); Sean Peterson, Payson, UT (US)

(73) Assignee: Torus Inc., South Salt Lake, UT (US)

( * ) Notice: Subject to any disclaimer, the term of this patent is extended or adjusted under 35 U.S.C. 154(b) by 0 days.

(21) Appl. No.: 18/666,557

(22) Filed: May 16, 2024

(65) Prior Publication Data
US 2024/0384776 A1   Nov. 21, 2024

Related U.S. Application Data

(60) Provisional application No. 63/502,648, filed on May 16, 2023.

(51) Int. Cl.
*F16F 15/315* (2006.01)
*F03G 3/08* (2006.01)
(Continued)

(52) U.S. Cl.
CPC ............ *F16F 15/3156* (2013.01); *F03G 3/08* (2013.01); *F16C 17/02* (2013.01);
(Continued)

(58) Field of Classification Search
CPC .... H02K 7/025; F16F 15/315; F16F 15/3153; F16F 15/3156
See application file for complete search history.

(56) References Cited

U.S. PATENT DOCUMENTS

| | | |
|---|---|---|
| 3,970,917 A | 7/1976 | Diggs |
| 4,186,245 A | 1/1980 | Gilman |
| (Continued) | | |

FOREIGN PATENT DOCUMENTS

| | | |
|---|---|---|
| CN | 217676608 U | 10/2022 |
| CN | 115626413 A | 1/2023 |
| (Continued) | | |

OTHER PUBLICATIONS

"The energy transition demands more than renewables and battery-based energy storage," Amber Kinetics—Take Charge, retrieve from https://amberkinetics.com/, retrieved on Feb. 25, 2023, pp. 5.
(Continued)

*Primary Examiner* — Daniel D Yabut
(74) *Attorney, Agent, or Firm* — VLP Law Group LLP; Michel Bohn

(57) ABSTRACT

A flywheel system may include one or more massive plates. A system may include two or more clamping plates including a bottom clamping plate and a top clamping plate, the one or more massive plates being located between the two or more clamping plates. A system may include two or more axles including a top axle and a bottom axle, the bottom axle being physically disconnected from the top axle. A system may include a plurality of fasteners coupling the top clamping plate with the bottom clamping plate, the plurality of fasteners applying a clamping force on the one or more massive plates using at least one of the two or more clamping plates and the two or more axles.

23 Claims, 24 Drawing Sheets

(51) Int. Cl.
   *F16C 17/02* (2006.01)
   *H02K 7/02* (2006.01)
   *H02K 7/09* (2006.01)

(52) U.S. Cl.
   CPC ........... *F16F 15/3153* (2013.01); *H02K 7/09* (2013.01); *F05B 2230/608* (2013.01); *F05B 2240/40* (2013.01); *F05B 2260/421* (2013.01); *F16C 2361/55* (2013.01); *H02K 7/025* (2013.01)

(56) References Cited

U.S. PATENT DOCUMENTS

| | | | |
|---|---|---|---|
| 4,538,079 | A * | 8/1985 | Nakayama ............ H02K 7/025 310/74 |
| 5,726,516 | A | 3/1998 | Randall |
| 6,614,142 | B1 | 9/2003 | Bonnieman et al. |
| 7,977,837 | B2 | 7/2011 | Oyama |
| 11,362,558 | B2 | 6/2022 | Sanders et al. |
| 11,824,355 | B2 | 11/2023 | Walkingshaw et al. |
| 2003/0029269 | A1* | 2/2003 | Gabrys ............... F16F 15/3153 74/572.11 |
| 2004/0051507 | A1 | 3/2004 | Gabrys et al. |
| 2011/0031827 | A1 | 2/2011 | Gennesseaux |
| 2012/0062154 | A1 | 3/2012 | Chiao et al. |
| 2012/0176074 | A1 | 7/2012 | Dubois et al. |
| 2013/0015825 | A1 | 1/2013 | Pullen |
| 2013/0261001 | A1 | 10/2013 | Hull et al. |
| 2014/0165777 | A1 | 6/2014 | Andrews et al. |
| 2014/0366683 | A1* | 12/2014 | Pullen .................. F16F 15/315 74/572.11 |
| 2016/0178031 | A1 | 6/2016 | Pullen |
| 2016/0241106 | A1 | 8/2016 | Veltri |
| 2016/0377147 | A1* | 12/2016 | Sun ...................... F16F 15/315 74/572.1 |
| 2020/0112216 | A1 | 4/2020 | Galmiche et al. |
| 2020/0212762 | A1 | 7/2020 | Dharan |
| 2020/0259379 | A1 | 8/2020 | Sanders et al. |
| 2022/0231572 | A1 | 7/2022 | Kesler |
| 2022/0243784 | A1 | 8/2022 | Pullen |
| 2023/0138936 | A1 | 5/2023 | Walker, III et al. |
| 2023/0246481 | A1 | 8/2023 | Walkingshaw et al. |
| 2024/0088706 | A1 | 3/2024 | Walkingshaw et al. |

FOREIGN PATENT DOCUMENTS

| | | | |
|---|---|---|---|
| GB | 2494783 | A | 3/2013 |
| IL | 289441 | A * | 12/2022 |
| JP | 2007-056710 | A | 3/2007 |
| WO | 93/07387 | A1 | 4/1993 |

OTHER PUBLICATIONS

Amiryar, M. E., et al., "Analysis of Standby Losses and Charging Cycles in Flywheel Energy Storage Systems", Energies, vol. 13, 2020, 22 pages.
Bianchini, C., et al., "Design of Motor/Generator for Flywheel Batteries", IEEE Transactions on Industrial Electronics, vol. 68, No. 1, Oct. 2021, pp. 9675-9684.
Ertz, Gabriel, Development, manufacturing, and testing of a multi-rim {hybrid} flywheel rotor, Diploma Thesis University of Alberta, Institute For Dynamics and Vibration, Jun. 10, 2014, 107 pages.
Groom, N. J., et al., "Fifth International Symposium on Magnetic Suspension Technology", NASA/CP-2000-210291, Jul. 2000, 746 pages.
Ha, Sung K., et al., Design and Manufacture of a Composite Flywheel Press-Fit Multi-Rim Rotor, Journal of Reinforced Plastics and Composites, 27, Feb. 25, 2008, SAGE Publications, pp. 953-965.
Ha, Sung K., et al., Design and Spin Test of Hybrid Composite Flywheel Rotor with Split Type Hub, Journal of Composite Materials, Jan. 9, 2006, SAGE Publications, pp. 1-18.
International Search Report and Written Opinion of Intl. Application No. PCT/US2023/061784, mailed Jun. 5, 2023 (12pages).
Kim, Seong J., et al., Design and fabrication of hybrid composite hub for multi-rim flywheel energy storage system, Composite Structures 107, 2014, pp. 19-29.
Machine translation of JP2007056710; Nakaseki et al. (Year: 2007).
International Preliminary Report on Patentability received for PCT Patent Application No. PCT/US23/61784, mailed on Aug. 15, 2024, 11 pages.
International Search Report and Written Opinion received for PCT Patent Application No. PCT/US2024/029771, mailed on Sep. 23, 2024, 16 pages.
International Search Report and Written Opinion received for PCT Patent Application No. PCT/US24/29773, mailed on Aug. 15, 2024, 12 pages.
International Search Report and Written Opinion received for PCT Patent Application No. PCT/US24/29779, mailed on Aug. 15, 2024, 13 pages.
International Search Report and Written Opinion received for PCT Patent Application No. PCT/US24/29793, mailed on Aug. 8, 2024, 7 pages.
Invitation to Pay Additional Fees received for PCT Patent Application No. PCT/US2024/029771, mailed on Jul. 30, 2024, 2 pages.

\* cited by examiner

STACKING FLYWHEEL AND LINKAGE

CROSS-REFERENCE TO RELATED APPLICATION

This application claims priority to U.S. Provisional Patent Application No. 63/502,648 filed on May 16, 2023. The present application is related to co-pending U.S. application Ser. No. 18/666,522, titled "Mechanical-Energy Storage Unit System" filed on May 16, 2024; U.S. application Ser. No. 18/666,542, titled "Flywheel Vacuum Enclosure and Adjustment System" filed on May 16, 2024; U.S. application Ser. No. 18/666,573, titled "Flywheel Magnetic Lift and Bearing System" filed on May 16, 2024; and U.S. application Ser. No. 18/666,593, titled "Mechanical-Energy Storage Unit and Assembly Fixture" filed on May 16, 2024; as the present application by common inventors. All of these applications are incorporated herein by reference, including their specifications and drawings, which disclosure is not admitted to be prior art with respect to the present invention by its mention in the cross-reference section.

BACKGROUND

The present disclosure relates to mechanical energy storage units. Implementations relate to flywheel-based mechanical energy storage units.

Currently, residential electricity customers, as well as electrical utilities, use various sources of electrical energy storage to offset varying electrical power production and use, such as the duck curve associated with solar or other renewable energy production. The variation in power production and usage has been further exacerbated with the increasing popularity of renewable power sources. These issues cause significant cost and other issues to utilities, power outages, and other issues.

Commonly, excess or backup power is stored in chemical storage, such as large chemical batteries. Unfortunately, chemical batteries suffer from many issues that make them undesirable at both a residential level and at a utility level. For example, chemical batteries may be very expensive, complex, and require numerous safeguards against fires. Chemical batteries are also ecologically unfriendly, as their production uses toxic chemicals, creates significant greenhouse gases, and results in significant material waste. Furthermore, chemical batteries have short lifespans because the batteries have a limited number of years and recharge cycles before they must be disposed of.

Previous solutions for mechanical energy storage have been overly complex, too large to be implemented at a residential level, not scalable for an electrical utility, or have faced other issues.

SUMMARY

In some aspects, the techniques described herein relate to a flywheel including: one or more massive plates; two or more clamping plates including a bottom clamping plate and a top clamping plate, the one or more massive plates being located between the two or more clamping plates; two or more axles including a top axle and a bottom axle, the bottom axle being physically disconnected from the top axle; and a plurality of fasteners coupling the top clamping plate with the bottom clamping plate, the plurality of fasteners applying a clamping force on the one or more massive plates using at least one of the two or more clamping plates and the two or more axles.

In some aspects, the techniques described herein relate to a flywheel, wherein the one or more massive plates include a plurality of flat plates having a substantially circular shape, the plurality of flat plates being held together using the clamping force.

In some aspects, the techniques described herein relate to a flywheel, wherein: the bottom axle extends through a perforation in a center of the bottom clamping plate, the bottom clamping plate applying the clamping force to the one or more massive plates via the bottom axle.

In some aspects, the techniques described herein relate to a flywheel, wherein the bottom axle includes a flat surface that applies the clamping force to a flat surface of a bottom-most massive plate of the one or more massive plates.

In some aspects, the techniques described herein relate to a flywheel, wherein: the plurality of fasteners include a plurality of bolts drawing the top clamping plate toward the bottom clamping plate; and the clamping force is applied at a center of the one or more massive plates via at least one of the two or more axles.

In some aspects, the techniques described herein relate to a flywheel, wherein: the clamping force is applied proximate to a peripheral edge of the one or more massive plates via one or more contact points between the bottom clamping plate and the one or more massive plates; and the flywheel includes a space between the bottom clamping plate and the one or more massive plates, the space being located radially outward from the bottom axle.

In some aspects, the techniques described herein relate to a flywheel, wherein: the one or more contact points include one or more of a bearing and a bushing that allows the bottom clamping plate to move radially relative to the one or more massive plates.

In some aspects, the techniques described herein relate to a flywheel, wherein the bottom clamping plate includes: a plurality of arms coupled together at a center of the bottom clamping plate, the center having an axle connection point for the bottom axle, the plurality of arms extending radially from the center to a plurality of arm ends; each of the plurality of arm ends including a connection point coupled with a fastener of the plurality of fasteners.

In some aspects, the techniques described herein relate to a flywheel, wherein: at least one of the two or more clamping plates include a plurality of perforations, the plurality of perforations receiving the plurality of fasteners, the plurality of fasteners being fewer than the plurality of perforations when the flywheel is fully assembled.

In some aspects, the techniques described herein relate to a flywheel, wherein a radius of the two or more clamping plates is less than a radius of the one or more massive plates.

In some aspects, the techniques described herein relate to a flywheel, wherein the one or more massive plates include a plurality of perforations for the plurality of fasteners; the two or more axles being located at an axis of rotation of the flywheel, the one or more massive plates lacking a perforation for the two or more axles at the axis of rotation.

In some aspects, the techniques described herein relate to a flywheel, wherein the plurality of fasteners include a plurality of bolts that are perpendicular to a radial direction of the flywheel and angled to an axial direction of the flywheel.

In some aspects, the techniques described herein relate to a flywheel, wherein a first of the plurality of bolts is at a first angle and a second of the plurality of bolts is at a second angle, the second angle being different from the first angle.

In some aspects, the techniques described herein relate to a flywheel, wherein the one or more massive plates include a plurality of contours at a peripheral edge of the one or more massive plates.

In some aspects, the techniques described herein relate to a flywheel, wherein the one or more massive plates lack any perforations.

In some aspects, the techniques described herein relate to a mechanical-energy storage unit including: an enclosure; a motor coupled with one or more of a top axle and a bottom axle; a top bearing coupling the enclosure with the top axle; a bottom bearing coupling the enclosure with the bottom axle; and a flywheel inside the enclosure including: one or more massive plates; two or more clamping plates including a bottom clamping plate and a top clamping plate, the one or more massive plates being located between the two or more clamping plates; two or more axles including the top axle and the bottom axle, the bottom axle being physically disconnected from the top axle; and a plurality of fasteners coupling the top clamping plate with the bottom clamping plate, the plurality of fasteners applying a clamping force on the one or more massive plates using at least one of the two or more clamping plates and the two or more axles.

In some aspects, the techniques described herein relate to a mechanical-energy storage unit, wherein the one or more massive plates include a plurality of flat plates having a substantially circular shape held together using the clamping force.

In some aspects, the techniques described herein relate to a mechanical-energy storage unit, wherein the bottom axle includes a flat surface that applies the clamping force to a flat surface of a bottom-most massive plate of the one or more massive plates.

In some aspects, the techniques described herein relate to a mechanical-energy storage unit, wherein: the bottom axle extends through a perforation in a center of the bottom clamping plate, the bottom clamping plate applying the clamping force to the one or more massive plates via the bottom axle.

In some aspects, the techniques described herein relate to a system including: an enclosure including a tub and a lid; a top bearing coupled with the lid and a top axle; a bottom bearing coupled with the enclosure and a bottom axle; a motor coupled with the lid via a mounting brace, the motor being coupled with the top axle; a flywheel inside the enclosure; the flywheel including: one or more massive plates; two or more clamping plates including a bottom clamping plate and a top clamping plate, the one or more massive plates being located between the two or more clamping plates; two or more axles including the top axle and the bottom axle, the bottom axle being physically disconnected from the top axle; and a plurality of fasteners coupling the top clamping plate with the bottom clamping plate, the plurality of fasteners applying a clamping force on the one or more massive plates using at least one of the two or more clamping plates and the two or more axles; and a magnet coupled with the lid and attracting the top clamping plate of the flywheel.

Other implementations of one or more of these aspects or other aspects include corresponding systems, apparatus, and computer programs, configured to perform the various actions and/or store various data described in association with these aspects. These and other implementations, such as various data structures for using or controlling the system, are encoded on tangible computer storage devices. Numerous additional features may, in some cases, be included in these and various other implementations, as discussed throughout this disclosure. It should be understood that the language used in the present disclosure has been principally selected for readability and instructional purposes, and not to limit the scope of the subject matter disclosed herein.

BRIEF DESCRIPTION OF THE DRAWINGS

This disclosure is illustrated by way of example, and not by way of limitation in the figures of the accompanying drawings in which like reference numerals are used to refer to similar elements.

DETAILED DESCRIPTION

Figure 1A:
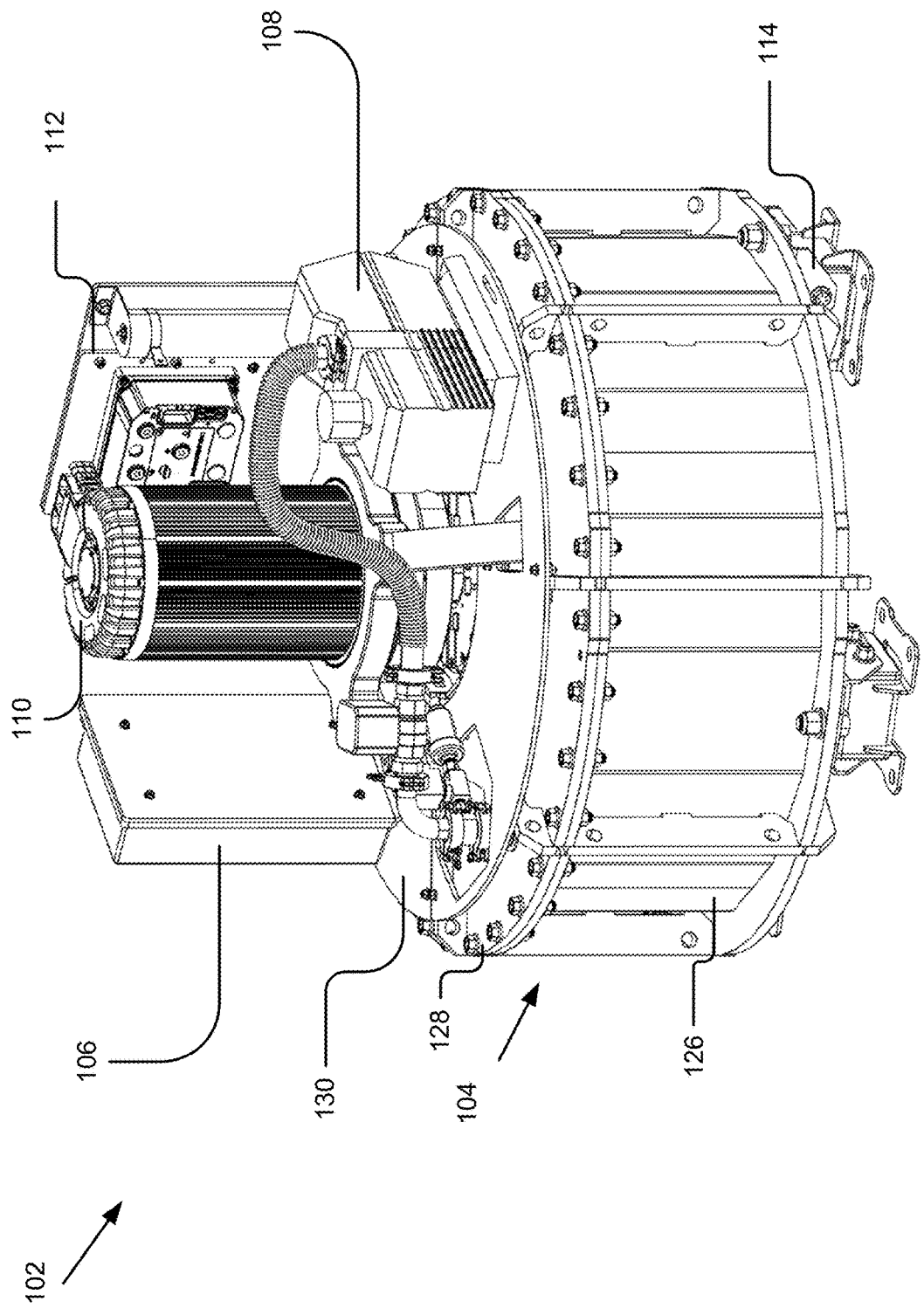
FIG. 1A illustrates an example mechanical-energy storage unit or flywheel assembly.

This description includes several improvements over previous solutions, such as those described in reference to the Background. A mechanical-energy storage unit 102 is described herein along a multi-part stacking flywheel and expandable and/or compressive linkage.

In some implementations, one or two mechanical-energy storage units 102 may be installed at a residence to provide backup power in case of a power outage, to store electricity generated using residential solar panels, or to offset unevenness of power production and usage (e.g., an electrical utility may control the mechanical-energy storage unit 102 at a residence to address the balance energy use/production at the residence, nearby residences, or across the power grid). A mechanical-energy storage unit 102 may be buried next to an electrical panel or placed in a shed outside a residence, placed in a garage or utility room, or stored offsite.

In some implementations, multiple mechanical-energy storage units 102 may be coupled together to scale energy backup at a larger facility, such as a business, or by an electrical utility. For instance, many mechanical-energy storage units 102 may be placed at a facility, buried, or otherwise used by an electrical utility. The multiple mechanical-energy storage units 102 may be communicatively linked to each other or to a central server to control storage and distribution of the stored energy (e.g., by controlling the rotational frequency of a flywheel 202 to keep various flywheels 202 at efficient speeds).

Various implementations and features of flywheel energy storage systems (FESS) are described herein. These provide improvements over previous energy storage units including other flywheels 202. For instance, the technology described herein provides an improved flywheel system or assembly, improved bearings, improved flywheel-motor couplings, improved flywheel housing, improved flywheel plates, among other improvements, features, and benefits.

For example, a flywheel 202 may include a rotational mass comprising a plurality of stacking plates 122, one or more bolt or clamping plates 120, one or more axle 208 members, and other features. For instance, the technologies described herein include a plurality of plates that may have contoured edges based on an associated support structure, which allows increased speeds while reducing failure modes. For instance, the support structure may include clamping plates 120 that apply pressure to stacking plates 122, thereby inducing friction between the plates to keep them in place and transfer rotational momentum between the plates and one or more axles 208. In some implementations, two clamping plates 120 may be clamped together by bolts or other fasteners, which thereby cause the clamping plates 120 to apply pressure on massive plates (e.g., in an axial direction), which may be referred to herein as stacking plates 122, and increase the friction among the stacking plates 122, which may, in some cases, allow the stacking plates 122 to be used without other fasteners, thereby improving safety and efficiency. Other features and benefits of the flywheel 202 are described below. Not only are the plates improved, but their support structure is improved, among other benefits. Further implementations and features allow the expansion, positioning, and use of the flywheel 202 thereby further improving its performance.

Among other improvements, the technologies described herein also include an improved enclosure 104 and support system, which may include, among other things, a sealed enclosure 104, a lid-mounted vacuum assembly 108, a magnetic coupling 118, various bearings, and positioning mechanisms. The enclosure 104 may include a magnetic lift assist mechanism 708 that either entirely supports or partially supports the weight of the flywheel 202 (e.g., to reduce wear on bearings). The enclosure 104 may also include a transport surface and a lifting and adjustment mechanism that moves the position of the flywheel 202 internal to the enclosure 104 from a transport or storage position and adjusts it in an active position. The enclosure 104 may provide support for various components, such as a supercapacitor 106, vacuum assembly, processor/controller/central processing unit, a motor 110, and other components. The enclosure 104 may include various features for maintaining a vacuum, holding one or more bearings, positioning a flywheel 202 during use or transport, mitigating damage due to structural failures, and isolating vibration, among other features.

Other benefits and features are described throughout this disclosure, but it should be noted that other features and benefits are contemplated. Furthermore, while various implementations are described in reference to the figures, these are provided by way of example and their features may be expanded, modified, or removed. For instance, features described in reference to some implementations may additionally or be used with other implementations.

With reference to the figures, reference numbers may be used to refer to components found in any of the figures, regardless of whether those reference numbers are shown in the figure being described. Further, where a reference number includes a letter referring to one of multiple similar components (e.g., component 000a, 000b, and 000n), the reference number may be used without the letter to refer to one or all of the similar components. Further, it should be noted that while various example features and implementations are described throughout this disclosure and the figures, these examples are not exhaustive of every contemplated implementation, feature or permutation. For instance, while a certain feature may be described in reference to a first implementation, the feature may be used with a second implementation or the features, operations, etc., may otherwise be exchanged between the implementations.

The innovative technology disclosed in this document also provides novel advantages including the ability to integrate modern technology with conventional power infrastructure; enable rapid transition to renewable energy sources; use the power grid as a backup; store power locally in nodes and regionalized storage clusters of nodes; isolate and minimize the impact of power outages; whether caused by natural disasters, infrastructure failure, or other factors; provide affordable alternatives to expensive and environmentally unfriendly electrochemical batteries; provide consumers the option to be independent from carbon-based power sources; and decentralize electric power production.

Figure 1B:
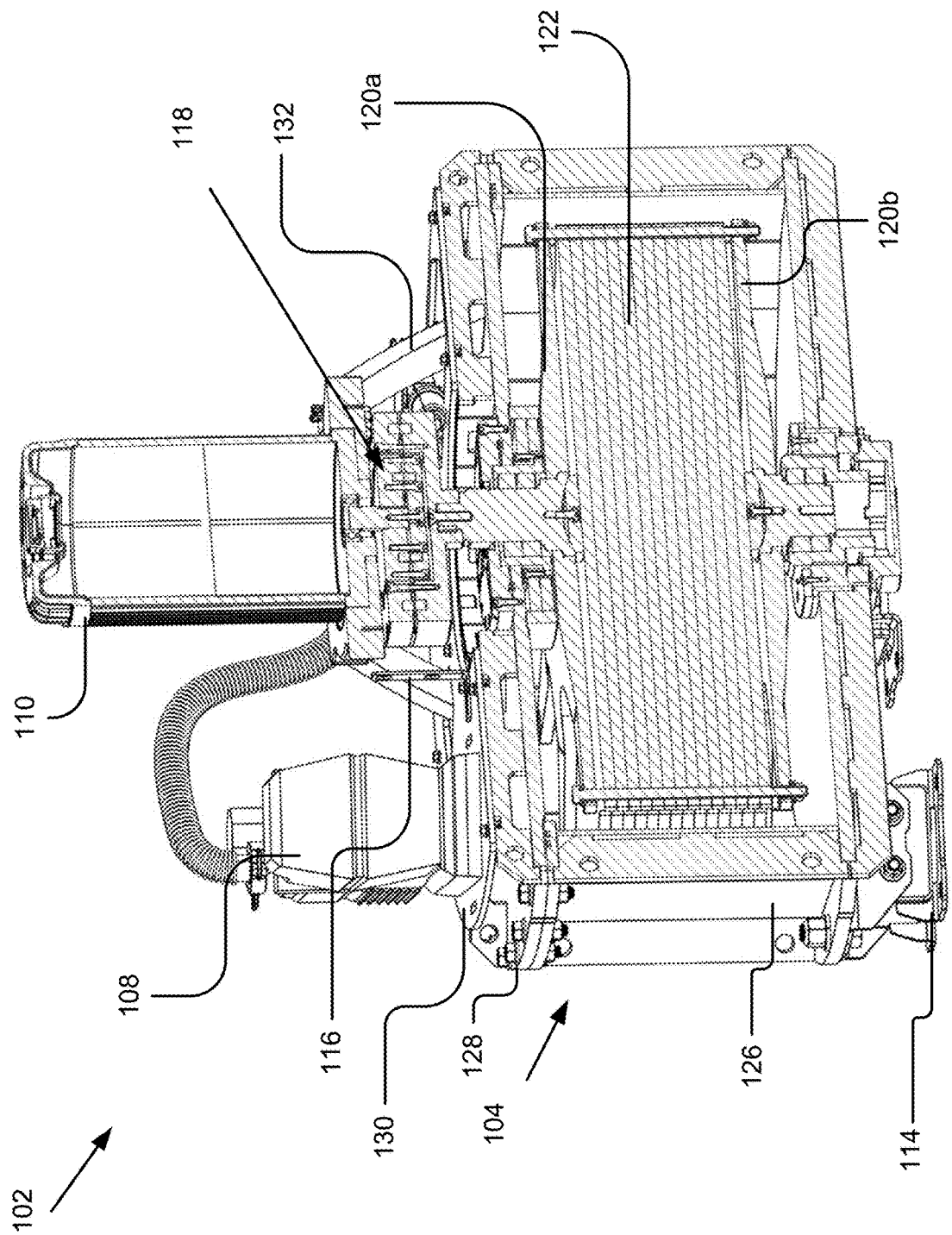
FIG. 1B illustrates an example cross section view of the flywheel assembly.
Figure 1C:
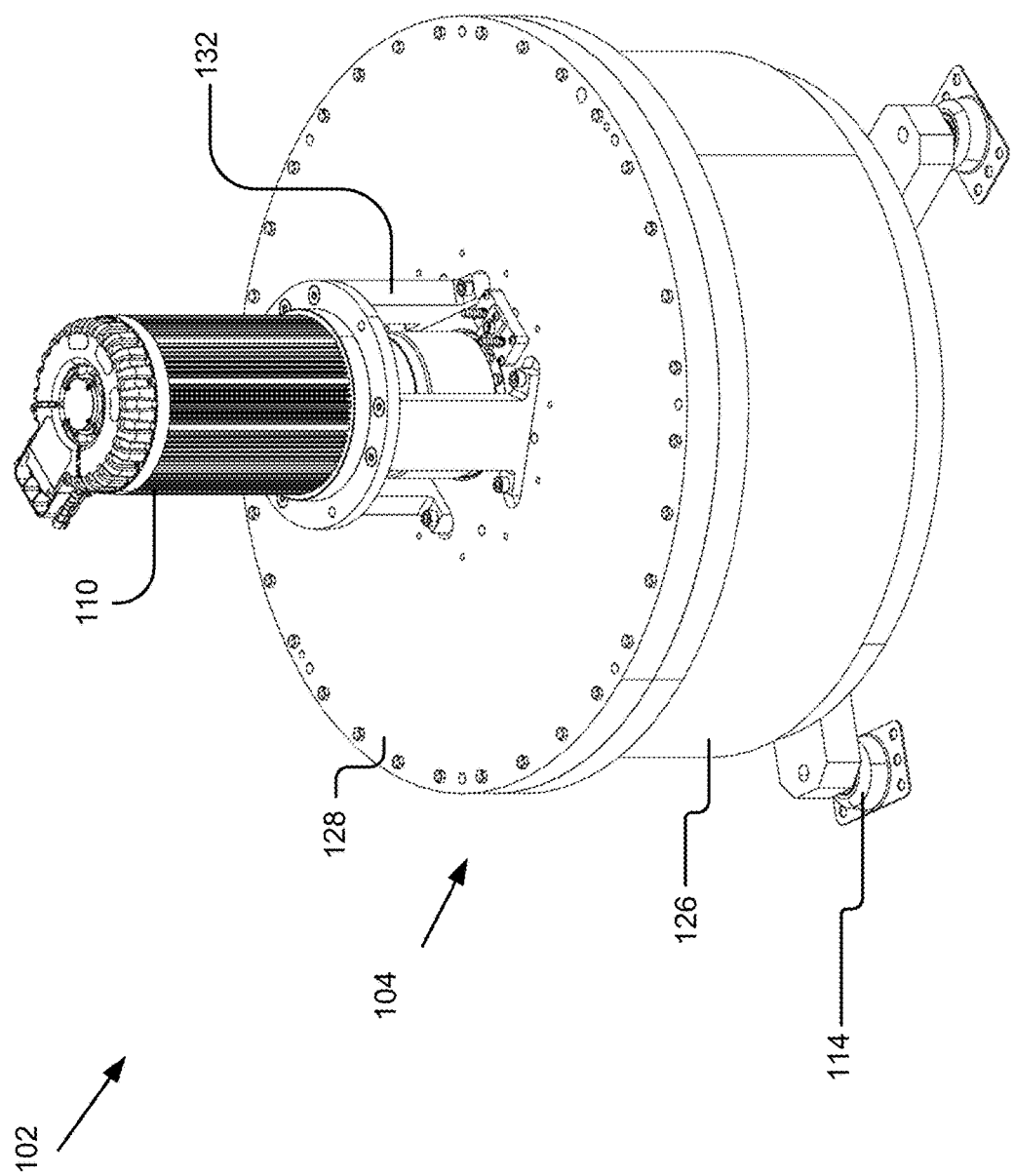
FIG. 1C illustrates another example flywheel assembly with a different implementation of the enclosure.
Figure 1D:
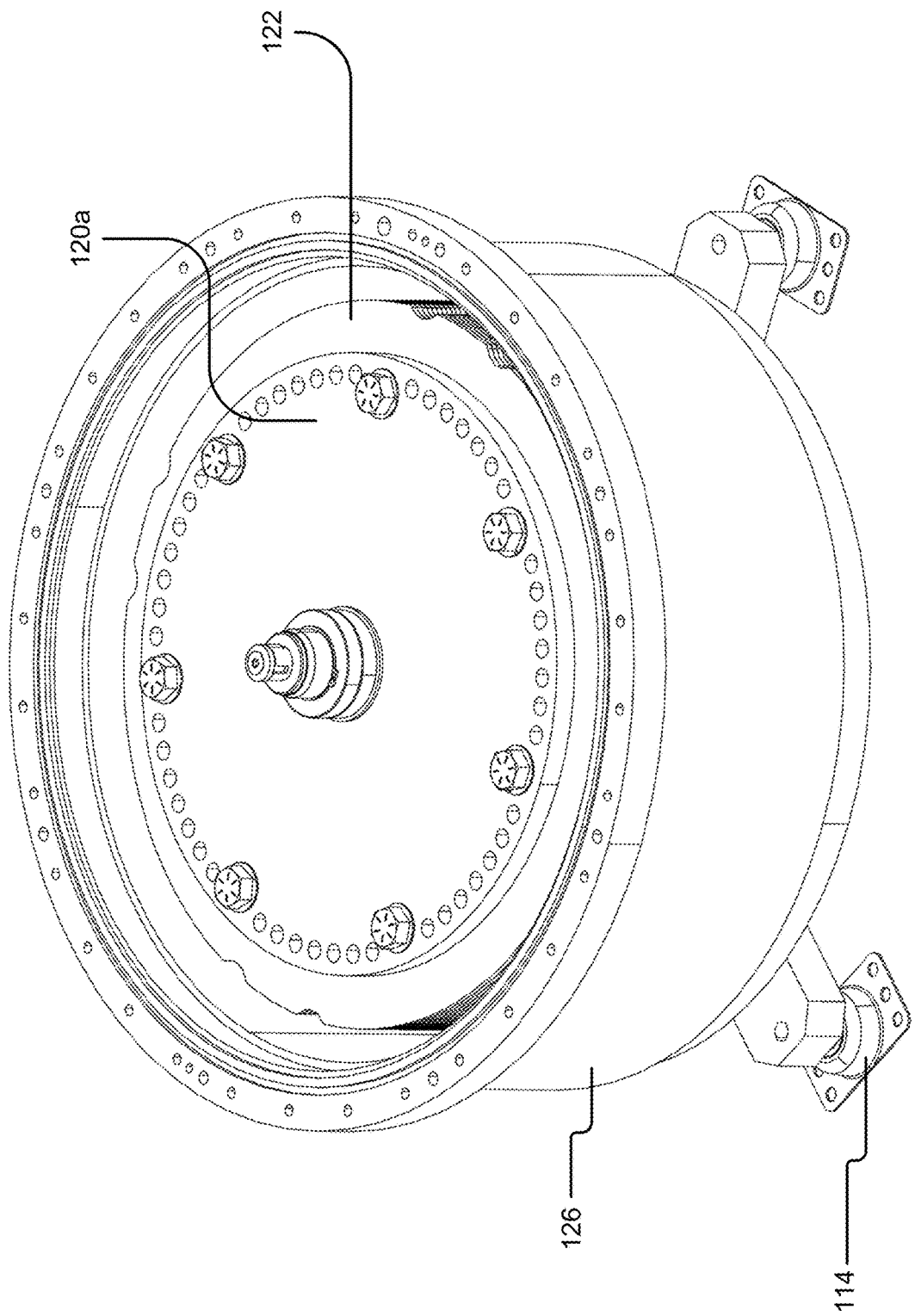
FIG. 1D illustrates the example flywheel assembly with a lid and other components omitted to show an example massive flywheel inside the enclosure.

FIGS. 1A-1B illustrate an example mechanical-energy storage unit 102 (MESU 102) or flywheel assembly 102 from various angles and views. For example, FIG. 1A illustrates a front-top view, FIG. 1B illustrates a cross section view, FIG. 1C illustrates a front-top view of another example MESU 102 or flywheel assembly 102, and FIG. 1D illustrates a front-top view with an enclosure lid 128 removed to show a flywheel 202 inside a flywheel enclosure 104 of an example MESU 102 assembly.

The improved flywheel assembly 102 may be a mechanical-energy storage unit 102 with configurations and features that improve manufacturability while also providing redundancy, safety, and reliability that allow the flywheel assembly 102 to provide years of safe and relatively maintenance free operation in ways that were not previously possible, for example, as may be noted in the Background and elsewhere herein. Although various configurations are possible and contemplated, the illustrated example flywheel assembly 102 may include a vacuum enclosure 104 and support structure, a massive rotating flywheel 202 (not visible in FIG. 1A) internal to the enclosure 104, a motor-generator 110 that may be fully or partially external to the enclosure 104 and coupled with the flywheel 202, a supercapacitor 106, driver(s) and/or CPUs, inverter(s), circuit breakers, a vacuum pump 108, and various other components, as described below, although other implementations are possible and contemplated herein.

The example flywheel assembly 102 may include, among other things, an enclosure 104 that is scalable to provide a vacuum, support to the flywheel 202 (not visible in FIG. 1A), a mounting structure for various components of the assembly, and protection against mechanical failure, among other things. The example vacuum enclosure 104 for the flywheel 202 may be configured as a vacuum assembly case with reinforcement including features for coupling the flywheel 202 with the case, an improved shape, and an ability to adjust the flywheel 202 through the case. In some instances, a connection for creating and/or maintaining a vacuum may also be included with the case. Example implementations and features of the enclosure 104 may be described elsewhere herein, although other implementations are possible and contemplated.

The flywheel enclosure 104 may be mounted and/or isolated from a mounting structure by one or more feet 114 or legs, as noted below, and may include mounting structures for accommodating various components of the assembly. For example, a supercapacitor 106 may be mounted to a support structure of or attached to the enclosure 104, which supercapacitor 106 may buffer energy entering/exiting the flywheel 202, for instance, by assisting the motor 110 to spin the flywheel 202 up or receive energy therefrom.

Also, as described below, the enclosure 104 may provide mounting points or structures for mounting a motor-generator 110 in line with the axis of rotation of the flywheel 202, although, in other implementations gears may be used to couple the motor-generator 110 with the flywheel 202. The motor-generator 110 may be coupled with the flywheel 202 via one or more axle 208 components and, in some instances, a magnetic coupling 118 that allows a flywheel axle(s) 208 to remain physically decoupled from a motor-generator 110 rotor while still providing force to pass between them, as described below. The motor-generator 110 may have an electrical connection to a supercapacitor 106, inverter, driver, CPU, external grid connection or otherwise, which allows electrical current to flow into the motor-generator 110 to spin up the flywheel 202 or out of the motor-generator 110 to receive stored potential energy from the flywheel 202.

The motor-generator 110 may have various configurations, as noted in further detail elsewhere herein. In some implementations, the motor-generator 110 may be an electrical-vehicle motor or other motor (e.g., a Hyper 9™ motor), such as a brushless alternating current motor (e.g., a 3 phase AC synchronous reluctance internal permanent magnet motor) that can free-wheel in order to allow the flywheel 202 to store power for a longer period of time. The motor size and configuration may vary depending on peak output/input and flywheel 202 size/speed requirements. For instance, a smaller, residential MESU 102 may include a smaller size flywheel 202 with a 30-40 KW motor while a larger, commercial (e.g., for a store, electrical utility, subdivision, etc.) may have a 300-500 KW motor, although other implementations are possible. The motor controller and/or CPU may be the same for various sizes of flywheels 202 or may vary depending on the implementation.

The motor-generator 110 may be coupled with the flywheel 202 using an axle 208 and bearing of the flywheel 202/flywheel enclosure 104. Similarly, in some implementations, the flywheel axle 208 and motor-generator 110 may be coupled using a flywheel 202 motor coupling, which may include a direct connection, magnetic coupling 118, friction clutch, torque converter, gearbox, or otherwise.

An example flywheel 202 (not visible in FIG. 1A) may be housed in and/or supported by the enclosure 104 and components thereof. Example flywheels 202 and features thereof are described throughout this disclosure. For example, a flywheel 202 may include a plurality of stacking plates 122 held together by a support structure, such as clamping plates 120 (e.g., using compression and friction). The support structure may include one or more axles 208 that attach thereto and provide support to the flywheel 202. As described in further detail elsewhere herein, the configuration of the support structure and axles 208 may allow flywheel plates to be used without the axle 208 perforating the plates. Depending on the implementation, the axle(s) 208 may be vertically and/or horizontally supported by other components or the flywheel enclosure 104 and may couple with a motor-generator 110 (e.g., as noted above).

For example, an axle 208 may interact with one or more bearings, whether magnetic, metal, ceramic, hybrid ceramic, etc., of the enclosure 104, to allow the flywheel 202 to spin about an axis formed by the axle 208. The enclosure 104 may include or couple with one or more bearings that support the flywheel 202 horizontally to keep it spinning with little-to-no vibration, as described below.

Additionally, one or more bearings may support the axle(s) 208 and/or flywheel 202 vertically within the enclosure 104. For instance, a bottom bearing may hold the bottom of the flywheel 202 and/or a top bearing may hold the top of the flywheel 202, for example, inside the enclosure 104. In some implementations, a magnetic lift assistance member 708 (e.g., illustrated in FIG. 7A) or magnetic levitation device may be used to reduce the friction or pressure, for example, on one or more of the bearings. For instance, a magnetic levitation device may be disposed at a bottom of the flywheel 202 to apply upward force thereon thereby limiting the force due to gravity on a bottom bearing and/or balancing force between a top and bottom bearing. In some implementations, a magnetic lift assistance member may be positioned at a top of the flywheel 202/enclosure 104 to pull the enclosure 104 upward, thereby decreasing the force due to gravity on a bottom bearing(s). As noted in further detail elsewhere herein, the magnetic lift assistance member may lift less then, exactly, or greater than the weight of the flywheel 202 so that there is some, little, or no weight on the bottom and/or top bearing(s).

The amount of weight held by magnets of the magnetic lift assistance member may be adjusted based on a distance from the magnets, as described elsewhere herein. For instance, the enclosure 104 may include or may be coupled with one or more flywheel 202 positioning components that may adjust the position of the flywheel 202, for example, to ensure that a correct distance between the flywheel 202 and magnetic lift assist mechanism 708, top bearing, bottom bearing, or other component of the assembly. For instance, a flywheel 202 positioning component may move the flywheel 202 (e.g., inside the enclosure 104) from a shipping position to an engaged position where it is in a correct position relative to the bearing(s) to minimize bearing wear and friction.

It should be noted that although the enclosure 104 is illustrated as fully enclosed, including reinforcements, welds, seals/O-rings, etc., that allow a vacuum to be maintained inside the enclosure 104 with the flywheel 202; however, it should be noted that other implementations are possible and contemplated herein, such as where the enclosure 104 is fully or partially open.

In some implementations, the flywheel assembly 102 may include various components mounted to the enclosure 104 (e.g., via a lid 128 assembly mounting plate or bracket) that support the operation of the flywheel 202. For instance, the flywheel assembly 102 may include a supercapacitor 106, motor-generator 110 (and associated mounting hardware), driver and CPU/controller 112, vacuum pump 108, various inverters, wiring harnesses, circuit breakers, and other equipment, although other implementations are possible and contemplated herein.

As illustrated in the examples of FIGS. 1A-1D, a flywheel enclosure 104 may be round with a flat bottom and top and various reinforcing ridges, which configuration may provide strength to the enclosure 104 to prevent buckling due to an internal vacuum while also preventing external damage in case of a mechanical failure of the flywheel 202. It should be noted that the enclosure 104 may be square, hexagonal, etc. It may have rounded (e.g., as illustrated in FIG. 1D) or flat sides (e.g., as illustrated in FIG. 1A). As illustrated in FIG. 1A, a mounting plate may be positioned on top of the enclosure 104 components mounted thereto, as described in further detail below.

In some implementations, as illustrated in the examples, the flywheel assembly 102 may include one or more (e.g., 3 and 4 arms are illustrated) motor mounts that couple with a lid 128 of the flywheel enclosure 104 and extend upward to support a motor mount brace 132, which may comprise a ring that holds the motor-generator 110 in alignment with an axis of rotation of the flywheel 202. In some instances, the motor mount braces 132 may include linear actuators that lift the motor-generator 110 vertically in order to decouple the motor-flywheel 202 coupling, such as the magnetic coupling 118 described in further detail below. The flywheel assembly 102 may include a lid assembly mounting plate(s) 130 that couple with top ribs or other structures of the enclosure 104 and provide mounting points for the various components of the flywheel assembly 102. In some instances, the lid 128 or lid assembly mounting plate(s) 130 may have various perforations that allow the motor mount braces 132, axles 208, motor-flywheel 202 coupling, vacuum pump 108 connection and other components to pass therethrough. Accordingly, the components may be securely mounted to mounting plate, lid 128, enclosure 104, or otherwise (e.g., as illustrated in the example figure) in order to speed assembly and improve stability.

As shown in the example of FIG. 1A, the enclosure 104 may have a plurality of reinforcing structures, such as ribs, rings, etc.

The enclosure 104 may also include one or more feet 114 or other supports that provide support to the ribs (e.g., the side or bottom ribs) or other structures (e.g., a bottom plate) of the enclosure 104 to secure the flywheel assembly 102, support the weight of the flywheel 202, and/or isolate the flywheel 202's movement/vibration; although, it should be noted that vibration is ideally limited by balancing the flywheel 202 and acceleration, temperature, or other sensors may be located in the bearings, axles 208, enclosure 104, or other components.

FIG. 1B illustrates an example cross section view of the flywheel assembly 102. For instance, as shown in the figure, a flywheel 202 having a number of stacking plates 122 and a top and bottom axle 208b is located inside an enclosure 104. The bottom axle 208b of the flywheel 202 is shown interacting with bottom bearings that support the flywheel 202 horizontally and/or vertically. The top axle 208a of the flywheel 202 is shown passing through a magnetic lift member 708 and into a magnetic coupling 118, which couples the axle 208 with a stator (directly or via other components, axles 208, drive shafts, gears, etc.) with the motor-generator 110, which is held vertically above the axle 208 using the motor braces 132. Additionally, as noted elsewhere herein, various sensors may be located throughout the assembly, such as the RPM sensor mount 116 that is located adjacent to the magnetic coupling 118, as well as various temperature, acceleration, etc., sensors that may be positioned adjacent to the motor 110, bearings, and other components of the assembly. These and other implementations and features are described in further detail below.

FIG. 1C illustrates another example MESU 102 or flywheel assembly 102 with a different implementation of the enclosure 104. As illustrated, an enclosure 104 may be a cylindrical enclosure with a base tub 126 and a lid 128. The enclosure 104 may also include one or more feet 114 (e.g., three are illustrated in FIG. 1C) or legs support the flywheel assembly 102. A foot 114 may include a bushing or other component that isolates vibrations, bolt holes to bolt the flywheel assembly 102 to a floor or other location.

In the depicted example, the motor-generator 110 may be mounted higher on motor mount braces 132 and/or base than the example of FIG. 1A, for example, to allow access to mount or remove the motor-generator 110, magnetic coupling 118, bearings, or other components. Additionally, while the other components illustrated in FIG. 1A are not shown in FIG. 1C, they may also be mounted to the lid 128 or another location of the flywheel assembly 102. For instance, a vacuum pump 108, supercapacitor 106, chemical battery, driver, CPU, etc., may be mounted to the lid 128, tub 126, other portion of the flywheel assembly 102, or otherwise.

FIG. 1D illustrates the example flywheel assembly 102 of FIG. 1C with the lid 128 and other components omitted to show an example massive flywheel 202 inside the enclosure 104. As shown, the flywheel 202 may be positioned at a center of the enclosure 104, although other implementations are possible. As illustrated in the example of FIG. 1D, a flywheel 202 may include one or more clamping plates 120 (the top clamping plate 120a is shown), one or more stacking plates 122, one or more bolts holding the clamping plates 120 together and/or to the stacking plates 122, and one or more axles 208. These and other features and implementations are described in further detail elsewhere herein.

FIGS. 2A-7C illustrate an example flywheel 202 and various components, views, and constructions thereof. There are a number of innovative features in the flywheel 202. For example, the flywheel 202 may include flywheel plates (120 and/or 122) that are coupled together using friction, which may be performed in addition to or in lieu of other connections, such as adhesive, welding, or otherwise. Some implementations of the flywheel 202 include bolts through components while others do not include bolts through components. Similarly, some implementations of the flywheel 202 include two separate axles 208-a top axle 208a and a bottom axle 208b. For instance, while previous flywheels 202 may include bolts attaching each of their components together, some implementations of the flywheel 202 herein may separate the axle 208 and/or use a clamping force from clamping plates 120 (and/or axles 208) to increase friction between the stacking plates 122 themselves, which may improve manufacturing and reduce points of failure when the flywheel 202 is spinning at high speeds.

In some implementations, clamping plates 120 may be used on the top and bottom of the flywheel 202 to support the flywheel 202, for example, by coupling the stacking flywheel plates 122 together and/or to axles 208. A top clamping plate 120a and a bottom clamping plate 120b may be drawn together by bolts at or near its peripheral edge, as described in elsewhere herein, which applies pressure inward on the stacking plates 122 in an axial direction thereby increasing friction. The friction may also allow rotational force to be transferred through the stacking plates 122 while also preventing them from moving out of alignment, which may throw the balance of the flywheel 202 off.

Depending on the implementation, the clamping force from the clamping plates 120 may be applied to the stacking plates 122 directly (e.g., by direct contact between the clamping plates 120 or stacking plates 122) and/or via other components, such as a portion of an axle 208 or other contact points (e.g., bushings or washers, as described below). For example, a clamping plate 120 may apply force to a center of the stacking plates 122 via a top and bottom axle 208*b* (and/or washer(s), ball washer(s), bushings at a peripheral edge or arm end, and/or otherwise).

In some implementations, the clamping plates 120 may be less massive than the stacking plates 122 (although other implementations are possible, as noted herein), so each type of plate may expand (and, potentially, become thinner) differently, especially at the peripheral edge. Accordingly, in some instances, bushings or other components may allow the stacking plates 122 to move relative to the clamping plates 120 while the clamping force is continuously applied. Example components for maintaining the clamping force are described elsewhere herein.

The clamping plates 120 may have various contours and configurations to allow them to provide clamping force and other functionality. In some implementations, the stacking plates 122 may be configured differently from the clamping plates 120 and their function is primarily to add rotational mass to the flywheel 202 in order to store energy. The stacking plates 122 may be massive plates that are substantially round or may include various contours based on interaction with the clamping plates 120 or an assembly fixture. Example stacking plates 122 and clamping plates 120 are described in further detail below.

Figure 2A:
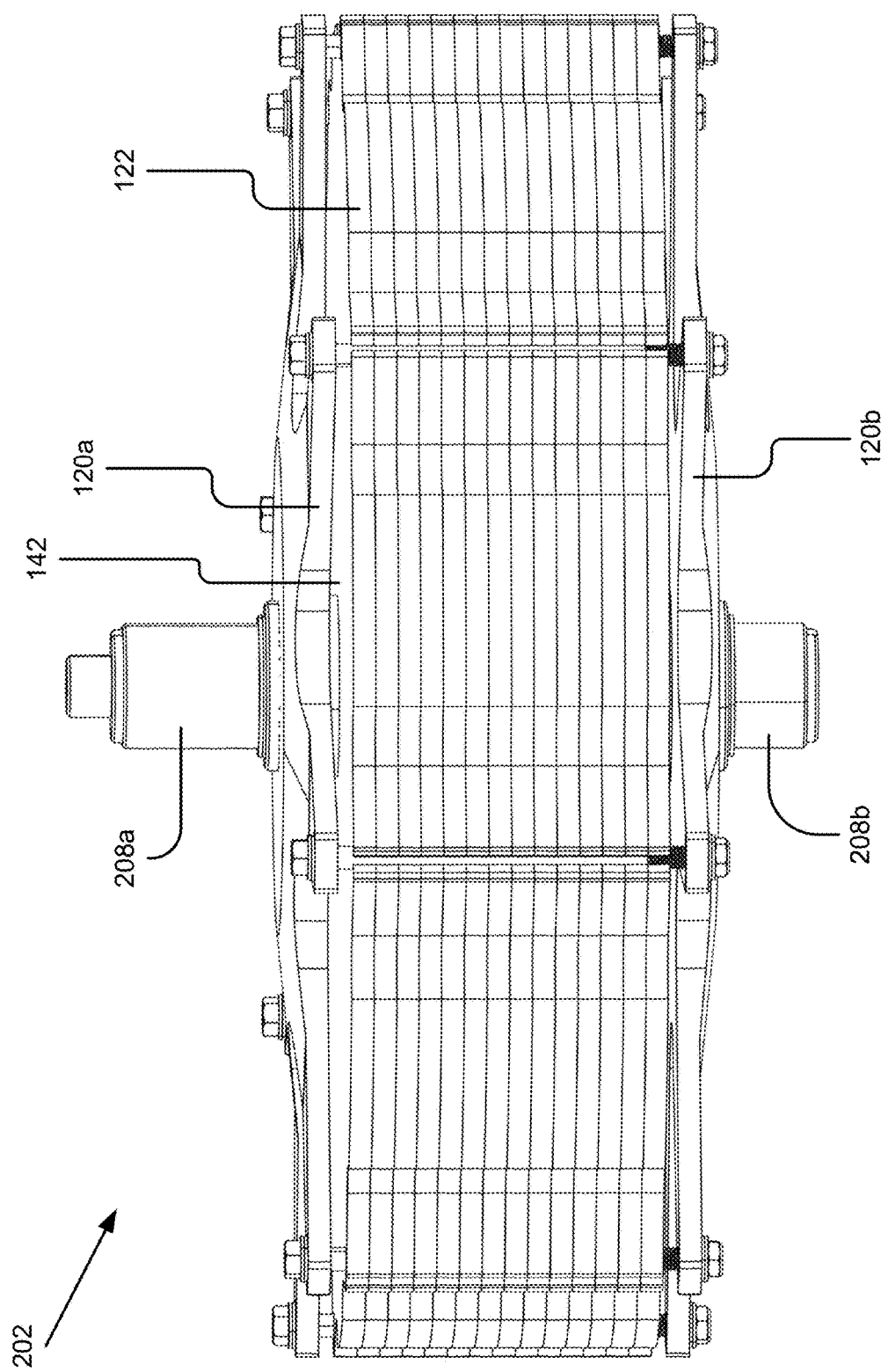
FIGS. 2A-2C illustrate various views of an example flywheel.
Figure 2B:
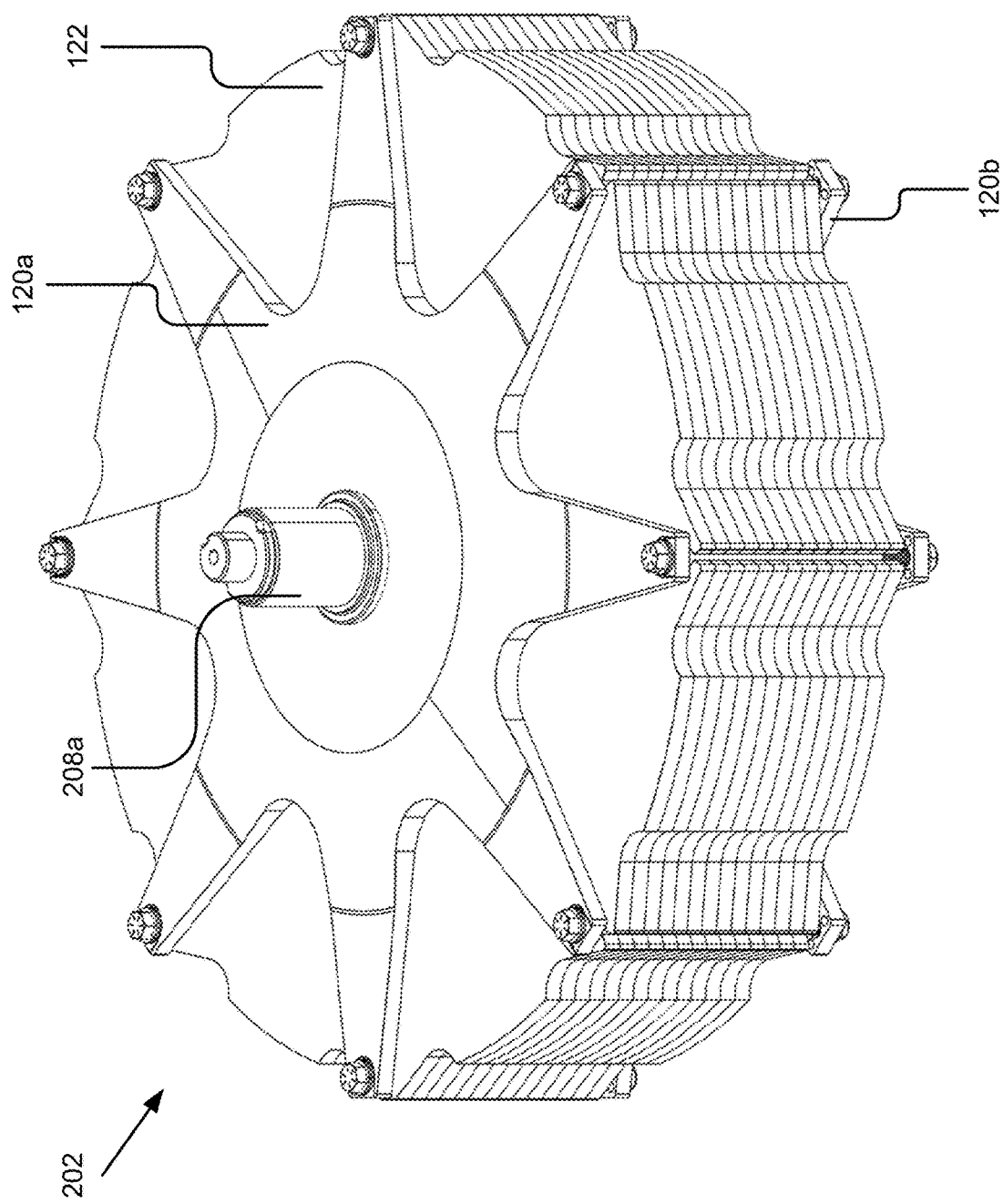
Figure 2C:
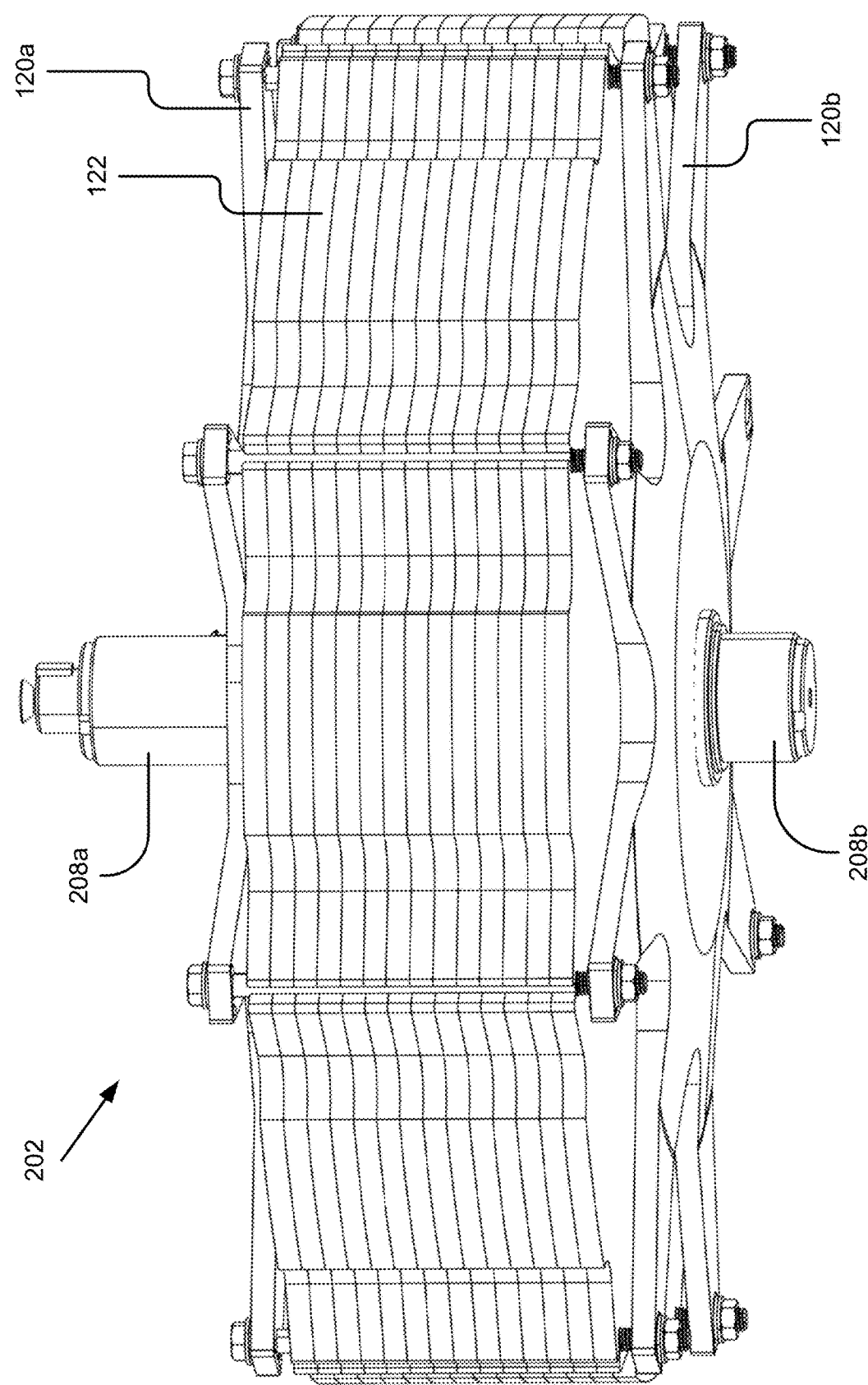

FIG. 2A illustrates a side view of an example flywheel 202, FIG. 2B illustrates a side-top view of the example flywheel 202, and FIG. 2C illustrates a side-bottom view of the example flywheel 202. As illustrated, a plurality of stacking plates 122 may be continuously stacked with their faces touching each other to minimize space consumed and flex while increasing friction. Fourteen stacking plates 122 are illustrated, although other implementations are possible and contemplated herein. As illustrated, there may be a space 142 between one or both of the clamping plates 120 and the stacking plates 122. Although this space 142 is illustrated as being relatively large and uniform, it may be smaller. For instance, the top clamping plate 120*a* may contact a top-most stacking plate 122, while there may be only a few millimeters between the bottom clamping plate 120*b* and the bottom-most stacking plate 122, which space may vary based on clamping force applied and flex of the clamping plate 120.

As illustrated in the example flywheel 202 of FIG. 2C, a bottom axle 208*b* may be coupled with a bottom clamping plate 120*b*. The bottom clamping plate 120*b* then interacts with a bottom flywheel stacking plate 122 (e.g., via bushings, an axle washer 232*b*, a portion of the axle 208, etc.). Various quantities of stacking flywheel plates may be stacked together depending on desired energy capacity, as noted elsewhere herein. Similarly, a top clamping plate 120*a* may interact with a top-most flywheel stacking plate 122 (e.g., via bushings, axle washer 232*a*, etc.). The top clamping plate 120*a* may be coupled with a top axle 208*a*. In other implementations, a bottom face of the top clamping plate 120*a* may rest directly against the top face of the top-most stacking plate 122.

In some implementations, each of the stacking plates 122 may be identical, and each of the clamping plates 120 may be identical, although other implementations (e.g., sizes, configurations, etc.) are possible and contemplated, as noted below. Similarly, the top and bottom axle 208*b* may be the same or different (e.g., having a different length, interacting with different bearings or configurations, as illustrated herein.

Figure 4A:
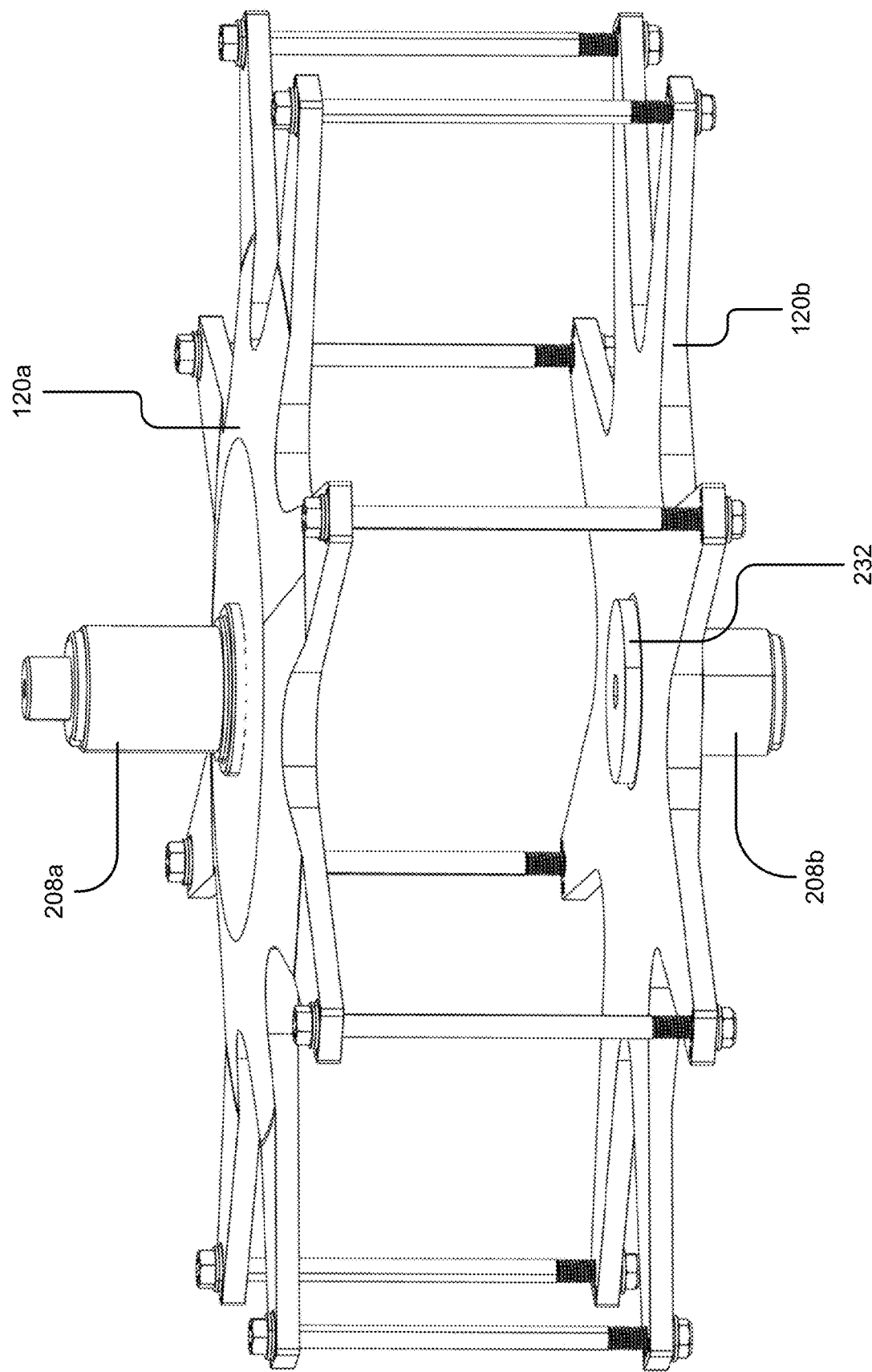
FIGS. 4A-4C illustrate example implementations of a flywheel support structure.

As illustrated, when assembled, the clamping plates 120 of the flywheel 202 may align with the stacking plates 122. In some implementations, a clamping plate 120 may have a star shape (e.g., as illustrated in FIGS. 4A and 4D) where the tip of each arm or branch of the clamping plate 120 has a bolt hole that receives a bolt for clamping the clamping plates 120 together. In some implementations, a clamping plate 120 may have another shape (e.g., as illustrated in FIGS. 2D, 2E, 4B, and 4C) including one or more perforations proximate to a peripheral edge.

Similarly, the configuration of the stacking plates 122 may be based on the shape (e.g., the position and quantity of branches of the clamping plate 120), as described in further detail below. For instance, bolt points of the stacking plates 122 may correspond to bolt points of the clamping plates 120 whether or not the stacking plates 122 contact the bolts.

Figure 2D:
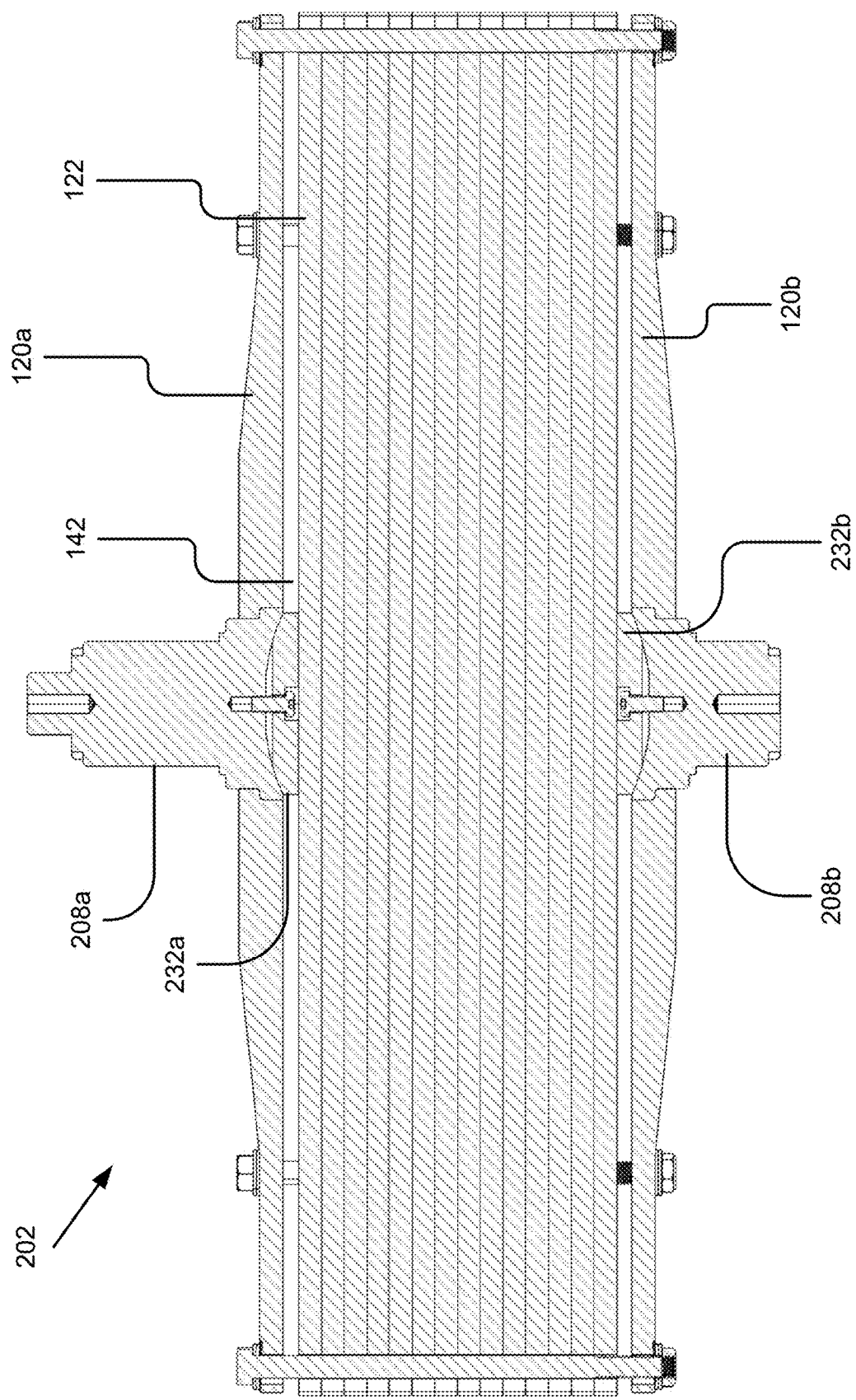
FIG. 2D illustrates a cross sectional view of an example flywheel.

FIG. 2D illustrates a cross sectional view of an example multi-part flywheel 202. As illustrated in the example implementation, a top clamping plate 120*a* may be connected with a top axle 208*a*. For instance, a top axle 208*a* may pass through the top clamping plate 120*a* so that the top clamping plate 120*a* may apply downward force on the axle 208. In some implementations, the axle 208 may include multiple parts, such as an axle 208 portion and a washer (e.g., an axle ball washer 232), where the washer (or a bottom portion of the top axle 208*a*) contacts a top-most stacking plate 122. Accordingly, via the axle 208, the top clamping plate 120*a* may apply force to the stacking plate(s) 122. It should be noted that other configurations, such as direct contact or contact through another device are possible without departing from the scope of this disclosure. Accordingly, the clamping plate 120 may apply pressure at a center of the stacking plate(s) 122 via the washer and/or axle 208.

Similar to the description of the top axle 208*a* above, a bottom axle 208*b* may be coupled to a bottom clamping plate 120*b* and may apply force to a bottom-most stacking plate 122. It should be noted that other configurations are possible, such as where the contact is direct, where the axles 208 are integrated with the clamping plates 120, where the axles 208 are integrated with one or more stacking plates 122, or otherwise.

Additionally, as described in further detail below, force may be applied (e.g., in an axial direction) to a center, periphery, and/or other area of the stacking plate(s) 122. For example, bolts may be tightened down on the clamping plate(s) 120, which apply force to an outer edge of the stacking plates 122. The force may be applied via direct contact between the clamping plates 120 and the stacking plates 122 or via an intermediary device, such as a bushing or washer (e.g., a ball washer or axle washer 232). In some instances, the clamping plates 120 may flex between the axle(s) 208 and the bolt(s) to provide the pressure. Accordingly, friction can be increased between the stacking plates 122. In some implementations, the stacking plates 122 may be simple, solid plates (e.g., as in FIG. 3A) rather than having perforations for fasteners in the plates, which may reduce strength and introduce stress risers due to centrifugal force, and which may lead to increased complexity and failure modes. In other implementations, the stacking plates 122 may have perforations (e.g., as in FIG. 3B) through which bolts may pass, which may increase a radius of the plates, provide simplicity in manufacturing, or increase an inter-plate (e.g., due to friction) force.

As described below, the bolts may be tensioned to varying levels of tension to cause the friction force. Although different configurations are possible and contemplated, as noted elsewhere herein, the flywheel 202 may include 8 bolts located around or proximate to a peripheral edge. Each bolt may be tightened to provide a defined torque or based on an applied force before the bolts are torqued (e.g., to apply a force of 2600 pounds per bolt), which may cumulatively provide a relatively even clamping and friction force across the stacking plates 122 (e.g., 16,000-21,000 pounds of clamping force).

In addition to their roles in clamping together the clamping plates 120, the bolts may include other features, such as the ability to mitigate failure of one or more stacking plates 122 (e.g., by catching a stacking plate 122 or portion thereof that slips or breaks). In some instances, the bolts may be replaced with other bolts of varying weights to assist in balancing the flywheel 202. Other details and implementations are possible and/or described elsewhere herein.

It should also be noted that the top axle 208a and the bottom axle 208b (e.g., as described in the examples of FIGS. 4A and 4B) should be aligned as perfectly as possible to reduce vibrations and improve alignment with bearings, etc. Although other implementations are possible, ball washers (e.g., 232) may be used with the axles 208 to allow some adjustability during assembly to improve alignment. It should be noted that flat washers or no washers (e.g., the axles 208 may be single components instead of broken into an axle body and axle washer 232) may be used.

As the axles 208 or axle washers 232 contact the stacking plates 122, the application of clamping force by the bolts may cause one or more of the clamping plates 120 (e.g., the arms thereof) of the bend slightly and increase the force at the center that is applied by the axles 208/axle washers 232. Depending on the implementation, the thickness of the axle washer 232 (or similar component) and the configuration of the clamping arms may be such that the distance between the ends of the arms (e.g., to the stacking plates 122) may be minimalized when the plates are clamped. In some implementations, in addition or alternative to the clamping force at the center of the stacking plates 122, the clamping plates 120 may apply clamping force along a peripheral edge of the stacking plates 122.

Figure 2E:
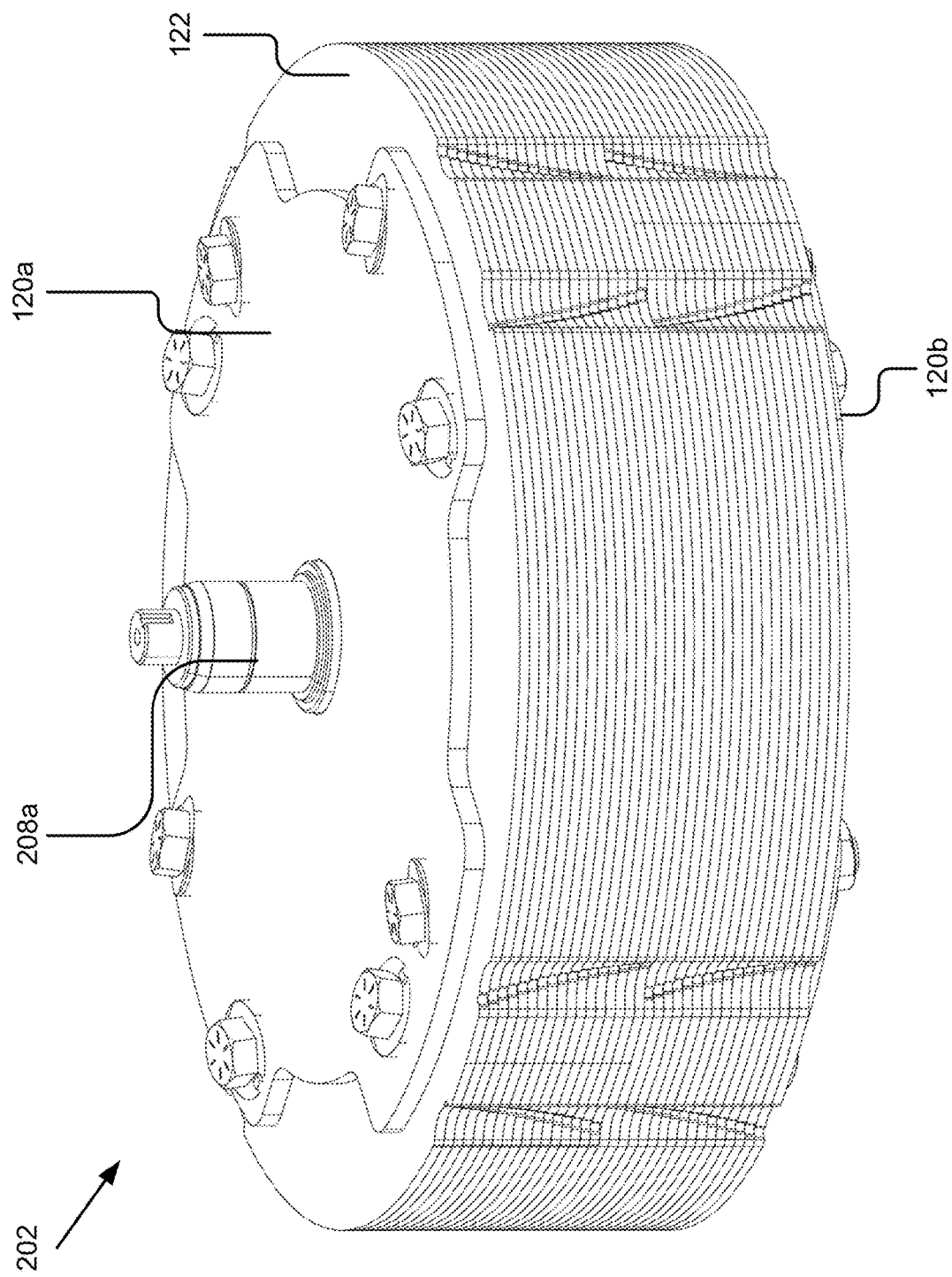
FIG. 2E illustrates a side-top view of an example flywheel.

FIG. 2E illustrates a side-top view of another example flywheel 202, according to some implementations. In the example of FIG. 2E, the shape of the clamping plates 120 has an X shape with two bolt holes proximate to the radial edge of each arm thereof. In the depicted example, the bolts may be angled as they pass from the top clamping plate 120a, through the stacking plates 122, and to the bottom clamping plate 120b. By angling the bolts, rotational forces across the clamping plates 120, stacking plates 122, and axles 208 may be reinforced, which reduces the odds that the plates will move out of alignment when the flywheel 202 is spun up or down though the axle(s) 208.

In the depicted example, the bolts may be angled toward each other or away from each other on alternating clamping plate arms, which improves uniformity of force (e.g., circumferentially and axially) and rotational balance. For instance, in a first arm, the bolts are angled away from each other at the top plate, while, at a second arm 90 degrees from the first arm, the bolts are angled toward each other at the top plate, which pattern may repeat, as illustrated. Where the top clamping plate 120a and the bottom clamping plate 120b are the same, they may be rotated 90 degrees, so that the holes on each match the angles of the bolts. For example, a bolt may be perpendicular to a radial direction of the flywheel 202 and angled around the periphery, for example, at an angle to the axial direction of the flywheel 202.

In the depicted example of FIG. 2E, the bolts extend through the top and bottom clamping plates 120b and through perforations in the stacking plates 122. In the example implementation where the bolts are angled, the bolts may use wedge shaped washers that allow the force from the bolts to be applied to the clamping plates 120. In some implementations whether with angled or straight (e.g., axial) bolts, the bolts and associated nuts may be tapered to allow them to extend partially into countersunk holes in the clamping plate(s) 120.

In the depicted example of FIG. 2E, the top clamping plate 120a (and potentially the bottom clamping plate 120b) may be substantially flat on its top and bottom surfaces, which allows the it to contact the stacking plates 122 and/or interact with a magnetic lifting component. For example, a very flat top surface of the top plate that interacts with a magnetic lifting component may reduce eddy currents in the top clamping plates 120a caused by rotation relative to the magnetic lifting component.

Figure 2F:
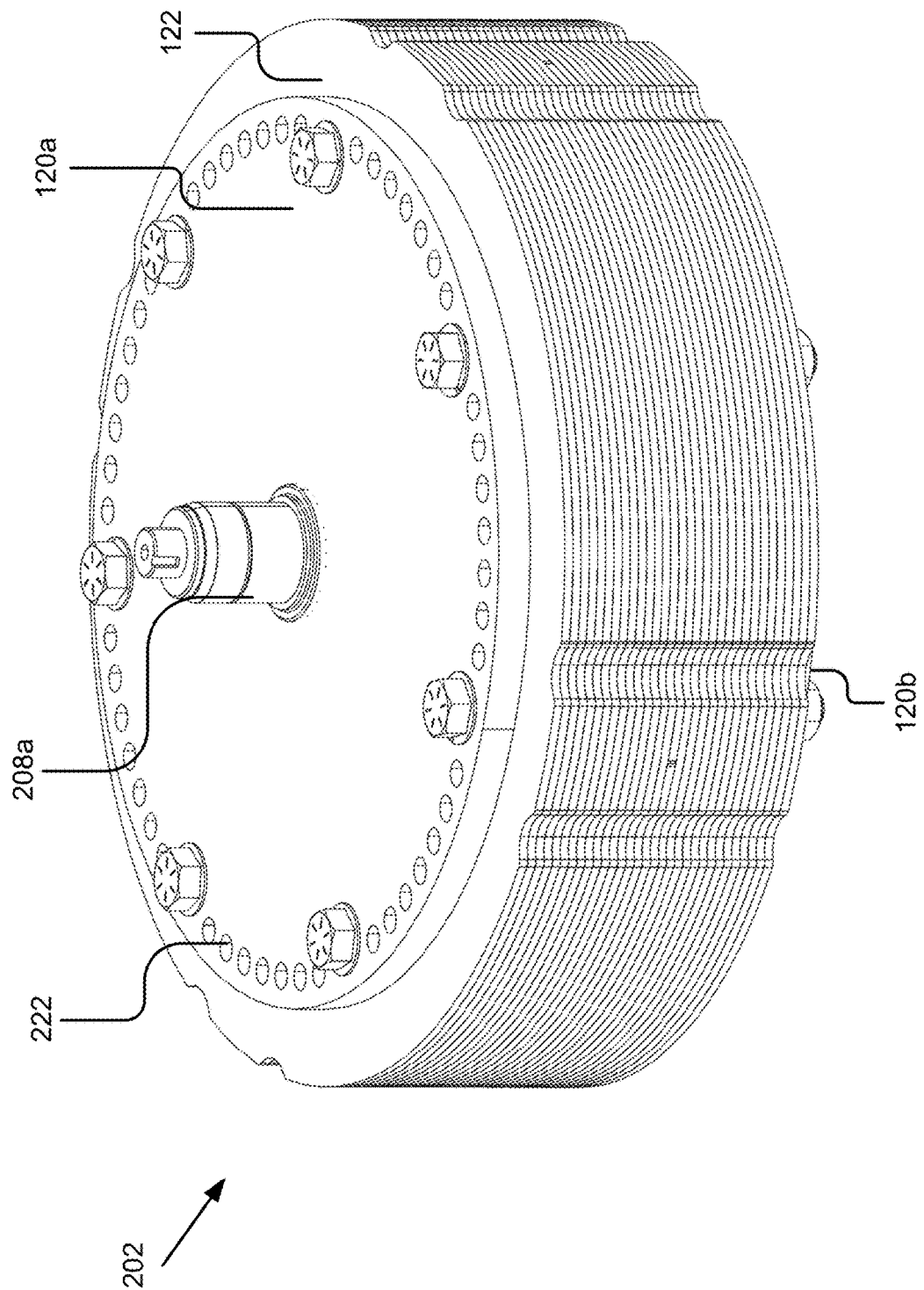
FIG. 2F illustrates a side-top view of an example flywheel.

FIG. 2F illustrates a side-top view of another example flywheel 202, according to some implementations. In the depicted example, the bolts extend axially through perforations 222 in the top clamping plate 120a, the stacking plates 122, and the bottom clamping plate 120b. Depending on the implementation, the stacking plates 122 may have an equal quantity of perforations 222 as the quantity of bolts clamping the clamping plates 120, the clamping plate(s) 120 may include additional perforations 222 proximate to their peripheral edge(s). These additional perforations 222 may be used in balancing the flywheel 202, for instance, by drilling out the holes or adding plugs to the holes. As noted elsewhere herein, there may be a space between one or both of the clamping plates 120 and the stacking plates 122. For instance, the top clamping plate 120a and top stacking plate 122 may lack a space (e.g., as at 142), which may prevent the top clamping plate 120a from flexing, thereby improving its flatness and interaction with a magnetic lift member. In some implementations, there may be a small gap/space between the bottom clamping plate 120b and a bottom-most stacking plate 122, which allows some flex in clamping (e.g., to increase a force at the center/axles 208). For instance, a portion of the bottom axle 208b and/or an axle washer (whether a ball washer or flat) may be used to provide a space between a center of the bottom clamping plate 120b and the bottom-most stacking plate 122.

As noted below, in some implementations, the stacking plates 122 (e.g., in any of the examples of FIGS. 2A-2E) may include contours or scallops 310 around a peripheral edge, which may reduce failure points due to radial stress around bolt holes and/or assist with aligning the plates. For instance, a scallop 310 may be a scalloped shape or contour removed or omitted from a peripheral edge of a stacking plate 122.

Figure 3A:
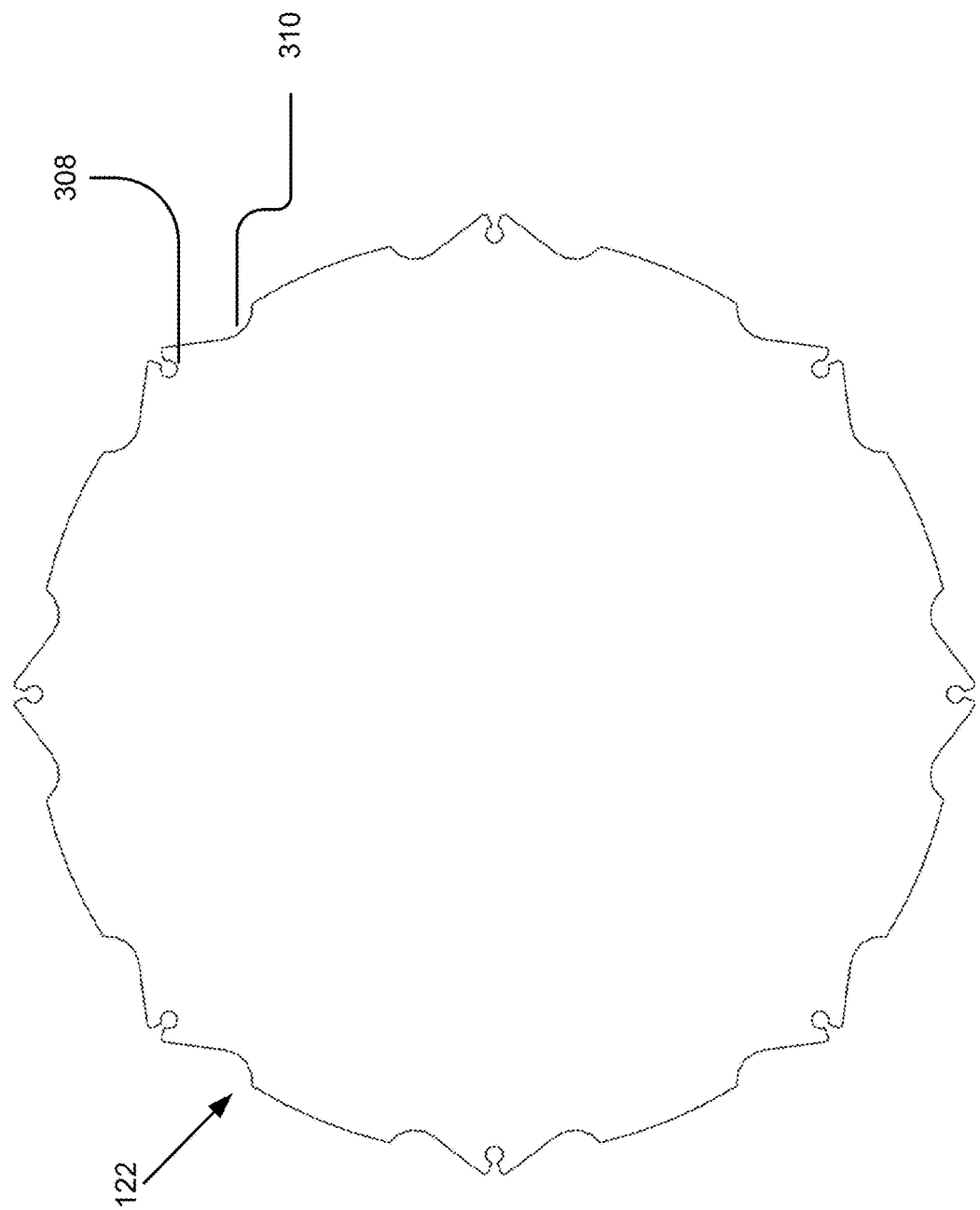
FIGS. 3A-3C illustrate views of example implementations of flywheel stacking plates.
Figure 3B:
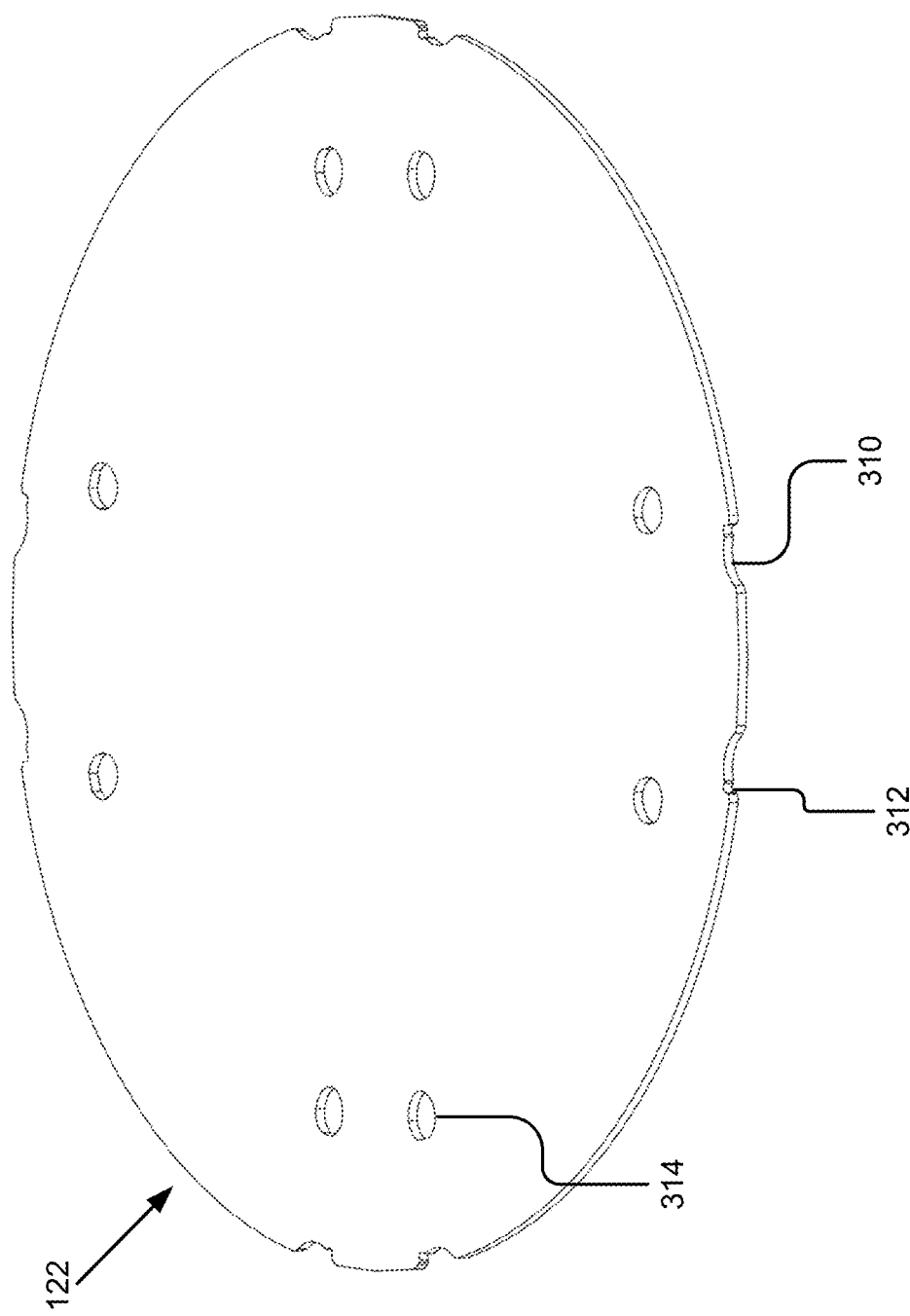
Figure 3C:
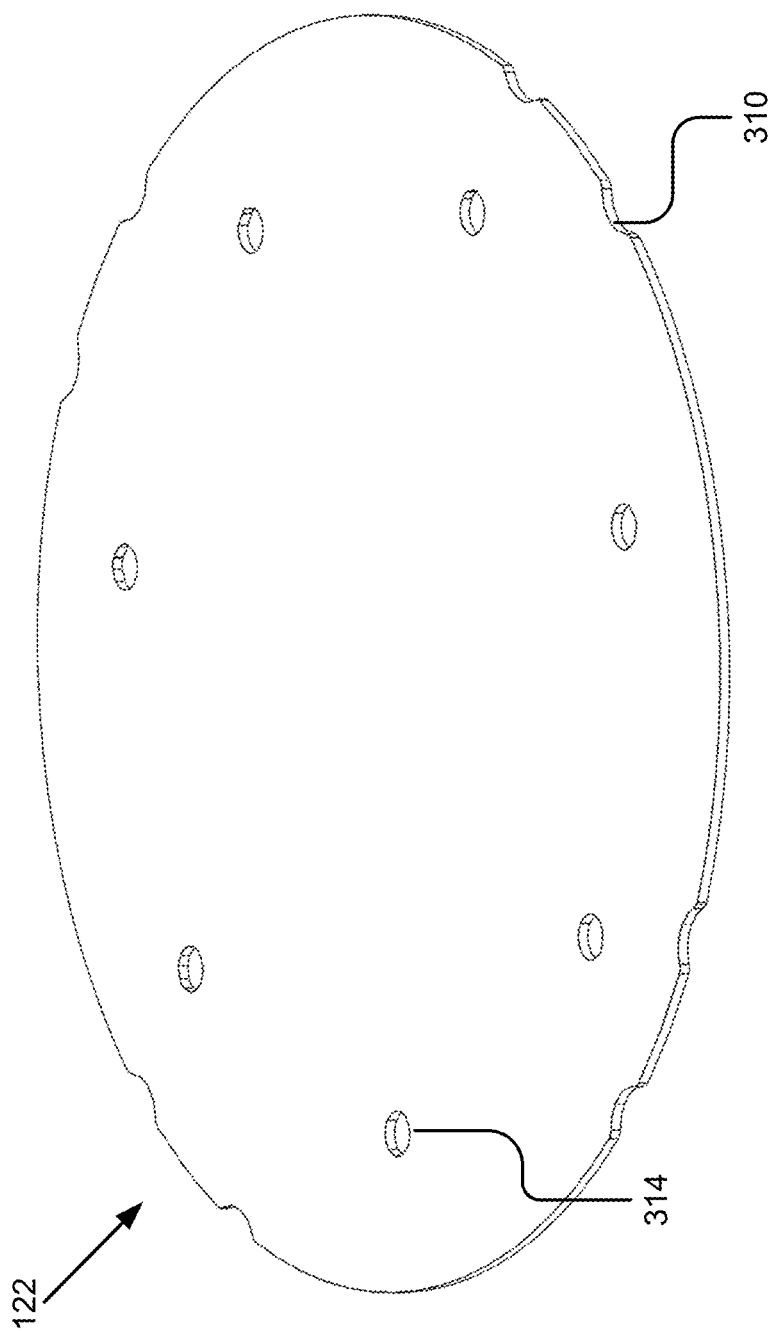

FIGS. 3A, 3B, and 3C illustrate views of example implementations of flywheel stacking plates 122. The example of FIG. 3A may be used with the example flywheel 202 shown in FIG. 2A. The example of FIG. 3B may be used with the example flywheel 202 shown in FIG. 2E. The example of FIG. 3C may be used with the example flywheel 202 shown in FIG. 2F.

The stacking plates 122 may be a flat sheet of metal, such as steel. Although the stacking plates 122 may include contours or perforations 314 (e.g., as in FIGS. 3B and 3C), in some implementations, they are solid plates without perforations (e.g., as in FIG. 3A or otherwise), which could increase internal stresses when spinning at high rotations per minute. For example, the stacking plates 122 may be 25 to 35 inches in diameter (e.g., an example implementation may be 27.71, 29.25, etc., inches in diameter), although other sizes are possible. The stacking plates 122 may have various thicknesses, such as 1/8$^{th}$ inch to 2 inches. For example, a stacking plate 122 may be 0.25, 0.47, 0.5, etc. inches thick. For example, each stacking plate 122 may have a weight of 20-200 pounds (e.g., 47, 94, etc., pounds). Additionally, any number (e.g., 10, 14, 24, etc.) of stacking plates 122 may be stacked without departing from the scope of this disclosure.

The shape and configuration of the stacking plates 122 may be varied depending on the implementation. For instance, a stacking plate 122 may include a clamping portion 308 or location at or proximate to a peripheral edge at which the stacking plates 122 may be clamped (e.g., in addition to or alternative from clamping at the axle 208). For instance, the illustrated example flywheel stacking plate 122 includes a clamping portion 308/location that is contoured based on a bolt location (e.g., associated with a size/shape of a clamping plate 120).

Although the outer edge of the stacking plate 122, at the clamping location 308, may be flat (or curved based on a radius of curvature of the plate), it may be contoured to increase contact area with a clamping bolt. For instance, where the bolt and/or associated nut has a round top or the bolt couples with the stacking plate 122 via a round washer (as described below), the clamping location 308 may be contoured around the bolt/washer that allow the force and stress to be distributed.

In some implementations, as illustrated in FIG. 3B, the contact area may be around a perforation 314 through the clamping plate(s) 120. In some instances, the clamping plate(s) 120 may have a countersunk region that interacts with a taper in the bolts and/or nuts.

Where the clamping force is applied to the stacking plates 122 via one or more bushings (e.g., at a peripheral edge, as in FIG. 3A), the clamping location 308 may be contoured based on the force applied by the bushing(s) and to avoid excess stress of the plate(s) at high rotational frequencies. In some implementations, the edge of the stacking plate 122 at the clamping location 308 may extend partially (e.g., as in FIG. 3A) or fully (e.g., as in FIGS. 3B and 3C) around the bolt, so that the bolt passes therethrough. For example, there may be a ½ inch, 1 inch, or other radius (e.g., 0.55 inches, 2 inches, etc.) contour that extends any distance (e.g., a few degrees to nearly 360 degrees) around the bolt in the stacking plate 122. It should be noted that, depending on the implementation, edges of the stacking plates 122 may or may not contact the clamping bolts. For instance, in order to reduce external stress on the bolts (especially where stacking plates 122 may expand outward at high rotational velocities/frequencies), spacing may be left between a bolt and the edge of the stacking plate 122, so that the stacking plate 122 does not put centrifugal force on the bolt. Similarly, where bolts may flex more than the stacking plates 122, a space may be left radially outward of the bolt to allow it to flex without putting additional stress on the stacking plate(s) 122. In other implementations, the stacking plates 122 may be designed to support outward flex of the bolts (e.g., to reinforce weaker bolts or benefit from stronger stacking plates 122).

In some implementations, a stacking plate 122, as shown in the example implementations of FIGS. 3A, 3B, and 3C, may include one or more scallops 310 at its peripheral edge that may reduce unsupported regions of the stacking plate 122 that may be more stressed without having sufficient support at high rotational frequencies. For instance, as illustrated in the example of FIG. 3A, the stacking plate 122 may include a scalloped region 310 on both sides of each clamping region. The scalloped region 310 may be gently rounded or contoured to avoid regions of the plate that may be more prone to failure. The scalloped regions 310 may be shaped as partial circles or may have another shape, such as the shape illustrated in the example of FIG. 3A. For example, a finite element analysis may be performed to determine load on various areas of stacking plate 122 (or other flywheel 202 components) in order to determine the shape of the scalloped areas 310, for example, based on the configuration of the clamping locations 308.

In some implementations, between the scallops 310, the flywheel 202 may include non-scalloped areas 310 that may be trimmed during balancing of the flywheel 202 (e.g., as noted below) without jeopardizing the structural stability of the plates.

Using the notches, cutouts, and/or scallops 310, can improve an overall safety factor for the flywheel 202 and/or allow it to operate at higher speeds without material failing or pulling outward; although it should be noted, that the plates may flex at high speeds/loads and the flywheel 202 may be engineered to accommodate for the change in shape, as described below.

In some implementations, the scallops 310 are designed to interact with one or more locations of an assembly fixture in order to improve alignment and manufacturability.

In some implementations, the technologies described herein allow a solid plate to be used even without welds, pins extending through the plates, and/or an axle 208 extending through the stacking plates 122. Accordingly, safety and maximum rotational velocity may be increased, depending on the implementation, while avoiding failure modes or balance issues introduced by these other methods, such as where a pin, axle 208, or weld introduces a weakness that may cause a structural failure.

The example flywheel stacking plate 122 illustrated in FIG. 3B may be used with angled bolts, as illustrated in FIG. 2D. The stacking plates 122 may have holes at various locations, so that they are stacked in order to allow the bolts to be angled therethrough. Similarly, the scallops 310 may include contours 312 that allow more precise alignment during assembly.

FIGS. 4A-7C illustrate an example flywheel and various components, views, and constructions thereof. There are a number of innovative features in the flywheel 202. The flywheel 202 may stack flywheel plates (e.g., 120 and/or 122) using friction, which may be performed in addition to or in lieu of other connections, such as adhesive, welding, or otherwise. For instance, the illustrated example may include stacking plates 122 that are friction fit in order to improve manufacturing and reduce points of failure when the flywheel 202 is spinning at high speeds.

For example, clamping plates 122 may be used on the top and bottom of the flywheel 202 to support the flywheel 202, for example, by coupling the stacking flywheel plates 122 together and/or to axles 208. For instance, a top clamping plate 208a and a bottom clamping plate 208b may be drawn together by bolts around its periphery (e.g., at the tips of star/arms), which applies pressure inward on the stacking plates 122 thereby increasing friction. The friction allows rotational force to be transferred through the stacking plates 122 while also preventing them from moving out of alignment, which may throw the balance of the flywheel 202 off.

Depending on the implementation, the clamping force from the clamping plates 120 may be applied to the stacking plates 122 directly (e.g., by direct contact between the clamping plates or stacking plates) or via other components. For example, a clamping plate 120 may apply force to a center of the stacking plates 122 via a washer 232 (e.g., a ball washer) or other portion of an axle 208 and/or bushings (e.g., as illustrated in the examples of FIGS. 5A and 5B) at a periphery of the clamping plates 120. For instance, in some implementations, because the clamping plates 120 may be less massive than the stacking plates 122, each type of plate may expand (and, potentially, become thinner) differently, especially at the peripheral edge. For example, bushings or other components may allow the stacking plates 122 to move relative to the clamping plates 120 while the clamping force is continuously applied. Example components for maintaining the clamping force are described in reference to FIGS. 4A-5B, for instance.

The stacking plates 122 may be configured differently from the clamping plates and their function is primarily to add rotational mass to the flywheel in order to store energy. The stacking plates 122 may be massive plates that are round or may include various contours based on interaction with the clamping plates 120, for example.

FIG. 4A illustrates an example flywheel support structure, which may include a bottom axle 208b, bottom clamping plate 120b, bolts, top clamping plate 120a, and top axle 208a according to some implementations. In the depicted example, for clarity, stacking plates 122 have been omitted for clarity. The example support structure of FIG. 4A may correspond to the example implementation of the flywheel 202 in FIG. 2A.

As illustrated in the example of FIG. 4A, the top axle 208a may couple with and/or extend through a top clamping plate 120a and a bottom axle 208b may couple with and/or extend through a bottom clamping plate 120b. In some implementations, a clamping plate's 120 primary purpose may be to induce friction and transfer force to/from the stacking plates 122 (not visible in FIG. 4A) rather than increase rotational inertia. Accordingly, the clamping plates 120 may be designed (e.g., by being thinner and/or not extending radially outward as far as the stacking plates 122) to apply vertical force to the plates 122, potentially while reducing high stress areas at the periphery where the clamping plates 120 may fail at high speeds. Accordingly, the clamping pressure may be increased and risk due to structural/material failure decreased. Example implementations of a clamping plate 120 are described in additional detail in reference to FIG. 4D below.

Additionally, the clamping plate(s) 120 may include a connection area for coupling with the axle(s) 208, which allows the rotational force to be transferred between the plates 120 and the axles 208. For instance, as described elsewhere herein, an axle 208a and/or 208b may extend fully or partially through a clamping plate 120 and have or more shapes or structures that allow rotational, as well as clamping force, to be applied onto the stacking plates 122 (e.g., via an axle 208). In some implementations, the axle(s) 208 may have axle washers 232/axle ball washers that extend beyond an inner edge of the stacking plate to apply force the stacking plates. Although the washers are illustrated as being approximately the size of the passthrough in the clamping plates 120, it should be noted that they may be omitted, combined with the axle body, be smaller radius than the passthrough, or be larger than the pass through (e.g., to apply force to the stacking plates 122 over a larger area).

As illustrated in the example, a number of bolts may extend through the ends of arms of the clamping plates 120 and be tightened to draw the clamping plates 120 toward one another. As the axles 208 or axle washers 232 may be contacting the stacking plates 122, the application of clamping force by the bolts may cause the arms of the bend slightly and increase the force at the center that is applied by the axles/axle washers 232 and/or directly by the clamping plate(s) 120. The thickness of the axle washer 232 (or similar component) and the configuration of the clamping arms may be such that the distance between the ends of the arms (e.g., to the stacking plates 122) may be minimalized when the plates 120 and/or 122 are clamped.

In some implementations, in addition or alternative to the clamping force at the center of the stacking plates 122, the clamping plates 120 may apply clamping force along a peripheral edge of the stacking plates 122. For instance, the ends of the arms may directly or indirectly contact the stacking plates 122 to apply the clamping force nearer to the outer edges of the stacking plates 122 and increase interplate friction. Where indirect contact is made, it may be via another component, such as a bushing or pivot point, or another intermediary device, as described in reference to the example of FIGS. 5A and 5B. The bushing(s) may allow the stacking plates 122 to move relative to the clamping plates 120, for example, because the stacking plates 122 may elongate to a greater extent than the clamping arms under load due to their relative mass and position of the mass (e.g., where the clamping plates 120 have vertical strength but less weight per volume/cross section). Accordingly, clamping force at the periphery may be increased, thereby increasing the ability for torque to be transferred through the stacking plates 122, clamping plates 120, and axles 208.

The top axle 208a may couple with and/or extend through a top clamping plate 120a and a bottom axle 208b may couple with and/or extend through a bottom clamping plate 120b. As a clamping plate 120 may induce friction and transfer force to/from the stacking plates 122. Accordingly, the clamping plates 120 may be designed to apply axial force to the plates without having high stress areas at the periphery where the clamping plates 120 may fail at high speeds. Accordingly, the clamping pressure may be increased and risk due to structural/material failure decreased. Example configurations of the clamping plates 120 are described elsewhere herein.

The clamping plates 120 may be constructed from aluminum, steel, or another material. For instance, the plates 120 may be constructed from a ferromagnetic steel (e.g., AR500 steel plate) and may be stamped, formed, or machined into the desired shapes. Example masses of the clamping plates 120 may be 66-68 pounds when constructed from steel, although other implementations are possible.

Figure 4B:
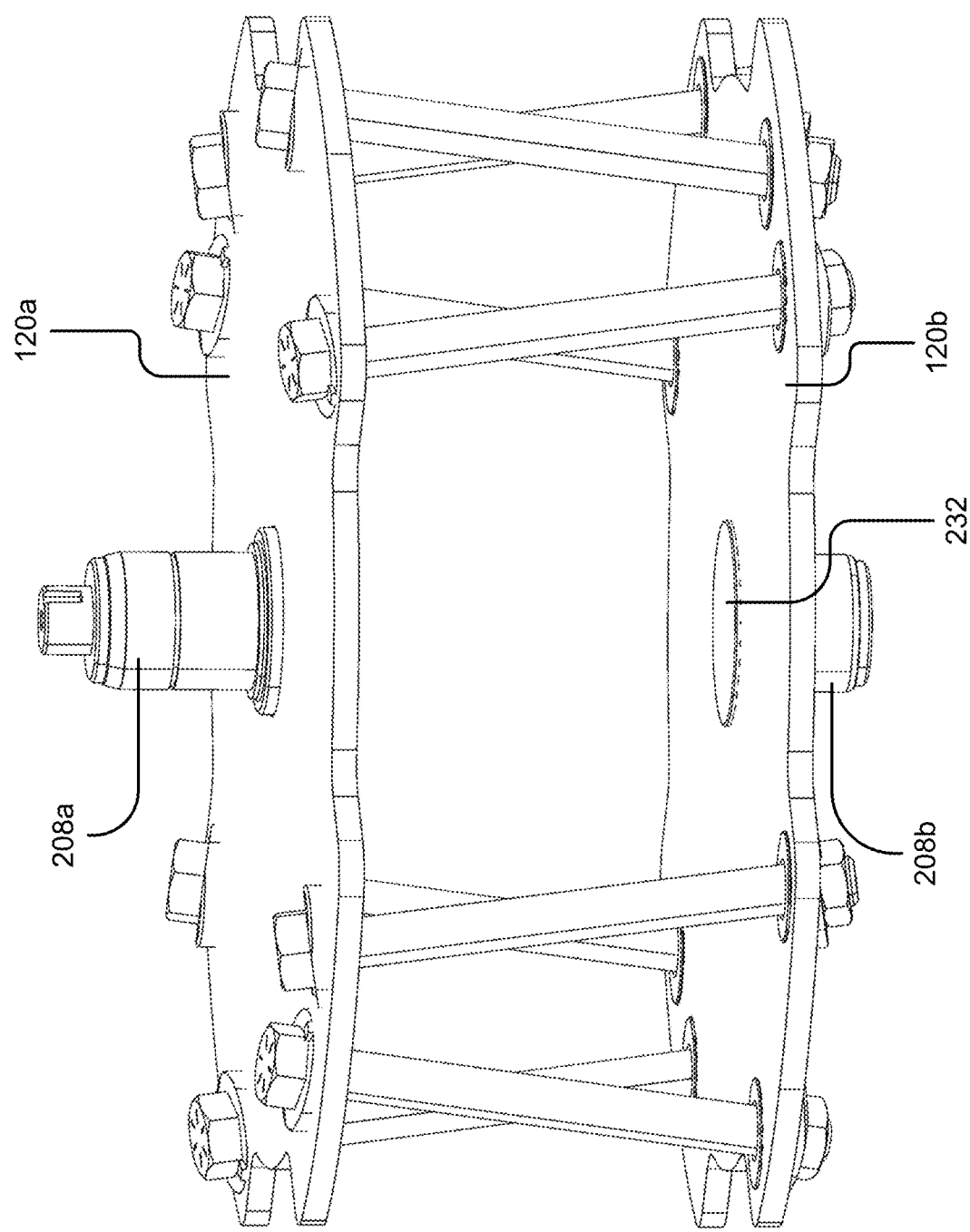
Figure 5A:
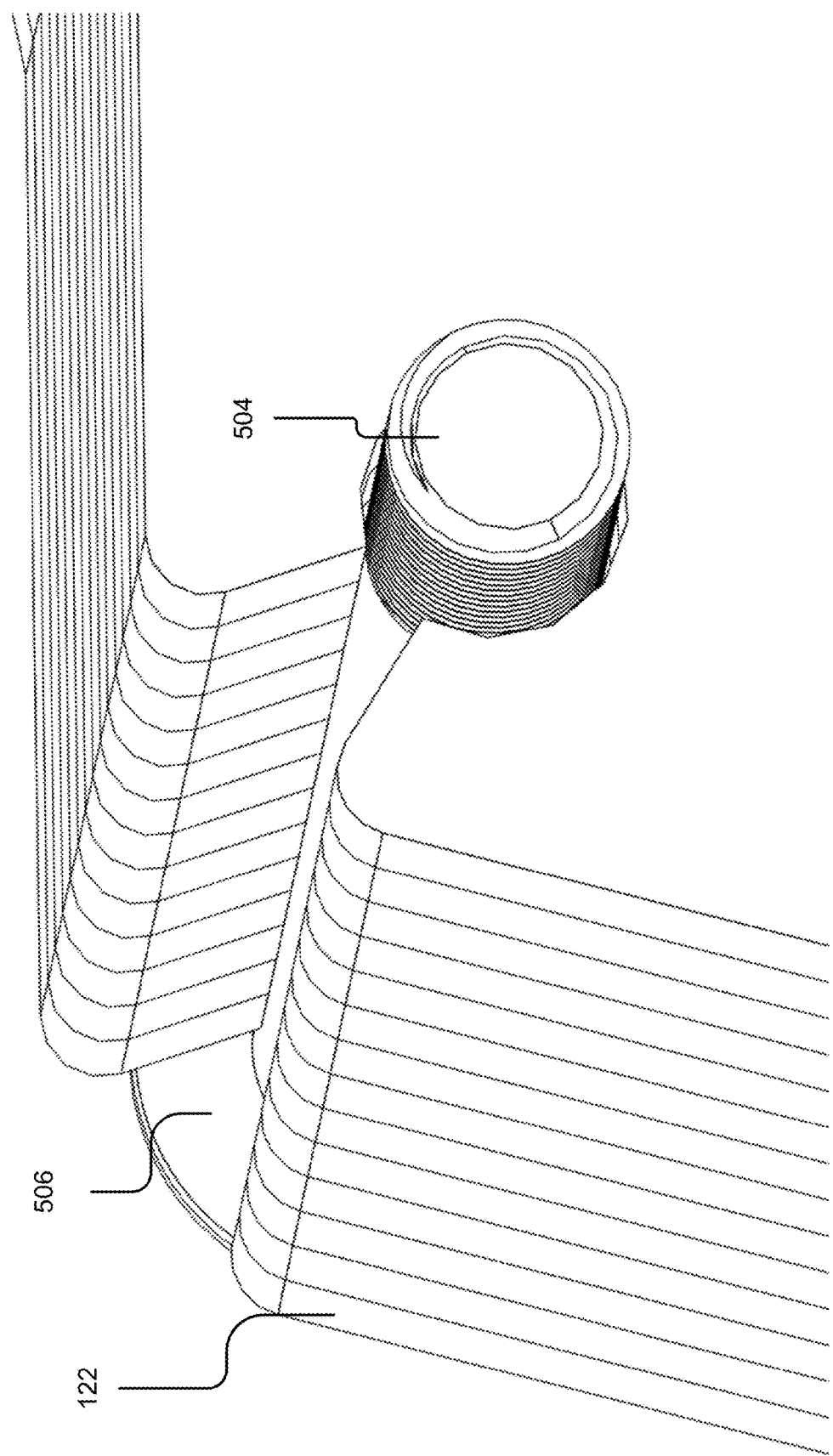
FIGS. 5A and 5B illustrate an example bolt interaction with one or more of a clamping plate and stacking plates.
Figure 5B:
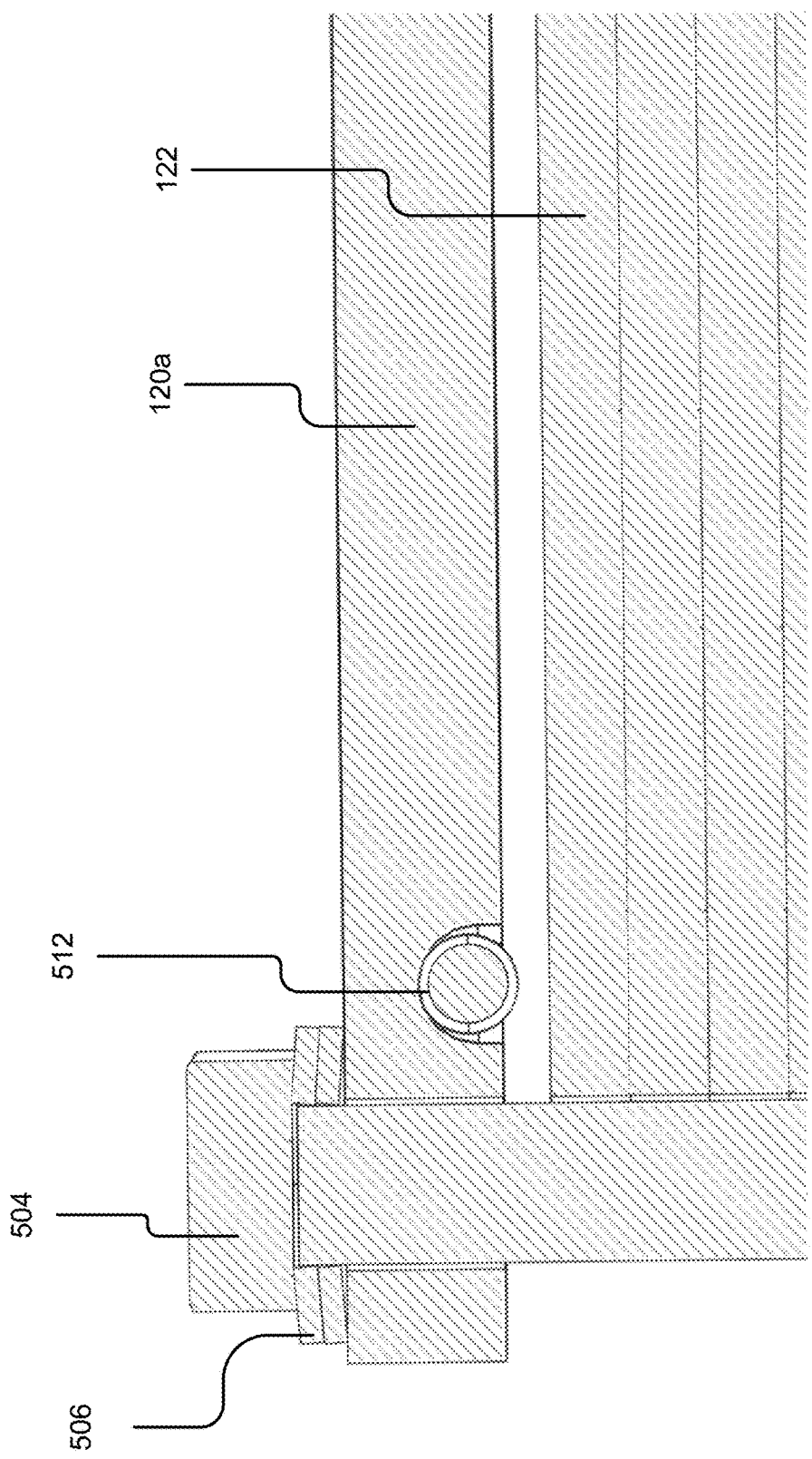

FIG. 4B illustrates an example flywheel support structure, which may include a bottom axle 208b, bottom clamping plate 120b, bolts, top clamping plate 120a, and top axle 208a according to some implementations. Similar to the example of FIG. 4A, stacking plates 122 have been omitted for clarity. The example support structure of FIG. 4B may correspond to the example implementation of the flywheel 202 in FIG. 2E.

In the depicted example, the top and bottom clamping plates 120 may be substantially flat and may have a perforation at a center for receiving an axle 208. The clamping plate(s) 120 may also include plurality of perforations (e.g., angled perforations or straight perforations) proximate to the peripheral edge of the clamping plate(s) 120. For instance, a clamping plate 120 may have four arms each with two bolt holes for bolts extending in different directions, as illustrated and as described in further detail above. In some implementations, the outsides of the bolts may use wedge shaped washers or the clamping plates 120 may have recesses to accommodate the angle(s) of the bolts. It should be noted that various angles of the bolts may be used and are contemplated herein depending on the implementation, for instance, angles less than 45 degrees from the axial direction may improve rotational force while avoiding excessively long bolts.

In some implementations, the arms of the clamping plate(s) 120 may be radially shorter than an outer edge of the stacking plate(s) 122, for example, which may decrease a centrifugal/radial force on the clamping plate(s) 120 while allowing them to providing clamping force.

In the depicted example, one or both of the top and bottom stacking plates 208a and 208b may contact stacking plates 122 or they may have a slight space, as noted above. For instance, the top and/or bottom axle(s) 208 may extend slightly inward from the clamping plates 120 to allow the clamping force, expansion, and/or flex, as described elsewhere herein. In some implementations, the bolts may additionally or alternatively include washers (whether the same or different thickness than the axle washer(s) 232) that also provide a slight offset or spacing between the clamping plate(s) 120 and the stacking plate(s) 122.

Figure 4C:
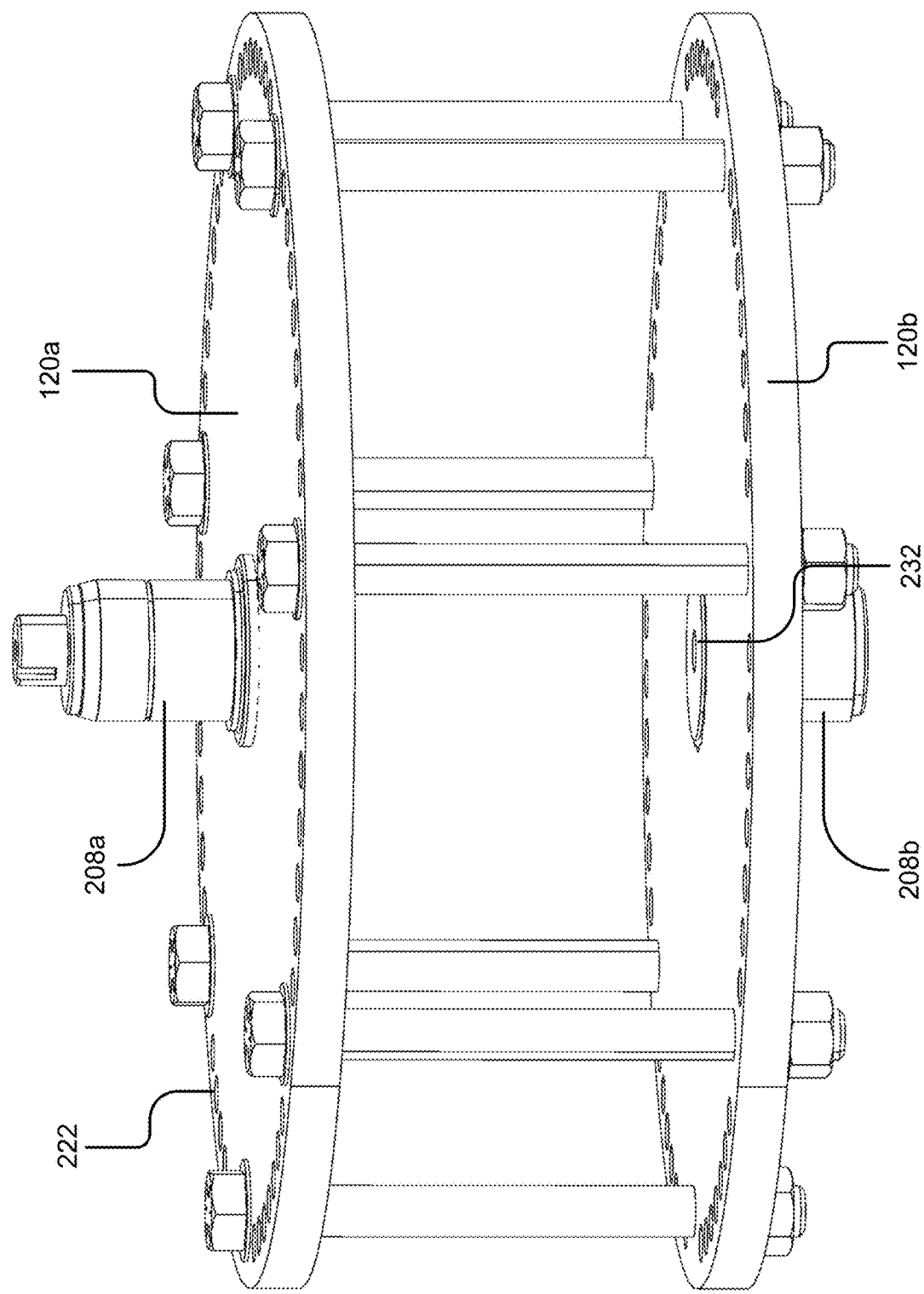
Figure 4D:
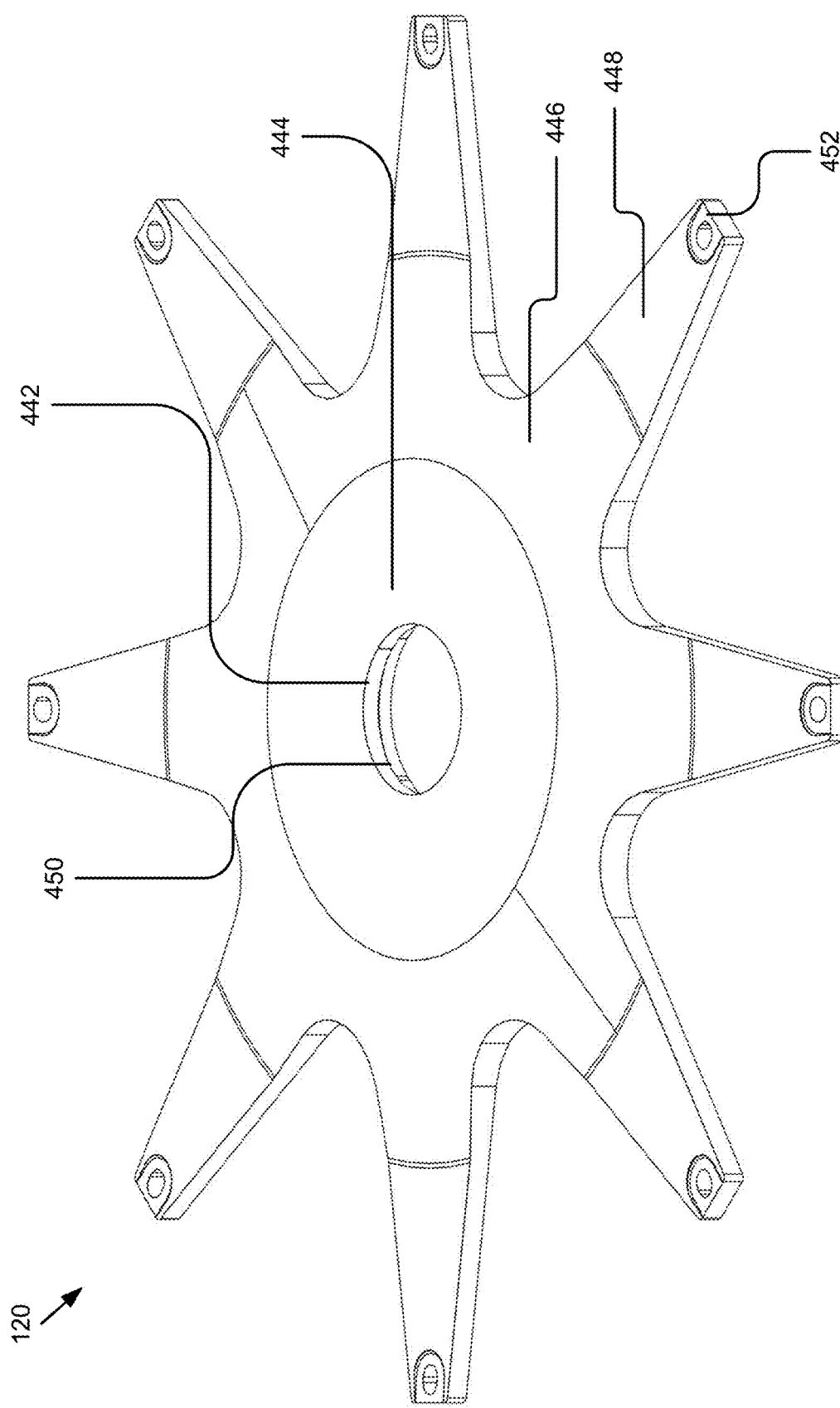
FIG. 4D illustrates an example clamping plate.

FIG. 4C illustrates an example flywheel support structure, which may include a bottom axle 208b, bottom clamping plate 120b, bolts, top clamping plate 120a, and top axle 208a according to some implementations. In the depicted example, for clarity, stacking plates 122 have been omitted for clarity. The example support structure of FIG. 4C may correspond to the example implementation of the flywheel 202 in FIG. 2F.

In the depicted example, the top and bottom clamping plates 120 may be substantially flat and may have a perforation at a center for receiving an axle 208. The clamping plate(s) 120 may also include plurality of perforations (e.g., angled perforations or straight perforations) proximate to the peripheral edge of the clamping plate(s) 120. The clamping plate(s) 120 may also have one or more additional holes 222 (fully or partially through the clamping plate(s) 120) in addition to the bolt holes, which, as noted above, may be used to reduce weight around the peripheral edge and/or to balance the flywheel 202, for instance, by drilling out one or more holes 222 or by inserting weighted plug(s) in the holes.

As shown in the depicted example of FIG. 4C, a clamping plate 120 may have a circular shape, which may, in some implementations, have a smaller radius than the stacking plates 122, as noted elsewhere herein.

In the depicted example, seven bolts are shown and are illustrated extending in a direction parallel to the axis of rotation of the flywheel 202. As noted elsewhere herein, features, components, or implementations of the technology described in reference to FIG. 4C may be used with that of FIG. 4A or 4B, etc.

In some implementations, as illustrated in the example of FIG. 4C (and FIG. 2F), the spacing (e.g., 142) may vary for the top clamping plate 120a and the bottom clamping plate 120b. For instance, a top clamping plate 120a may directly, flatly contact a top-most stacking plate 122 (e.g., as shown in FIG. 2F), so that the top clamping plate 120a remains flat. For instance, the top axle 208 may be different, shorter, or omit an axle washer. By keeping the top-clamping plate 120a flat against the stacking plate(s) 122, it may remain flatter which reduces eddy currents generated when it spins relative to a magnetic lift assistance member 708.

In some implementations, there may be a space between a bottom clamping plate 120b and a bottom-most stacking plate 122. For instance, as noted elsewhere herein, a center of the bottom clamping plate 120b may be held away from the bottom-most stacking plate 122 by a portion of the bottom axle 208b and/or an axle washer 232. In some implementations, when the bolts are tightened, there may be a small amount of deflection/flex of the bottom clamping plate 120b, which may cause peripheral edges of the bottom clamping plate 120b to contact, not contact, or indirectly put pressure (e.g., through washers or bushings) proximate to a peripheral edge of the stacking plates 122, for example, as illustrated in FIG. 2F.

FIG. 4D illustrates an example clamping plate 120. As illustrated, the clamping plate 120 may have an axle-connection region 442, a flat center region 444, a tapered region 446, and outer arm portions (also referred to as arms) 448. For instance, the clamping plate 120 may be a star shaped with contours in the outer edge that define the arm portions 448. It should be noted that although eight arms 448 are illustrated, other quantities may be used depending on desired strength and maximum rotational frequencies (e.g., the clamping plate 120 may be round as in FIG. 4C or have four arms as in FIG. 4B).

In some implementations, the axle-connection region 442 may connect to an axle 208 in order to transfer force between the clamping plate 120 and the axle 208. The axle-connection region 442 may include an axle interaction step 450 that allows the clamping plate 120 to apply clamping force on the axle 208 (e.g., on a corresponding lip or step thereof), although the axle 208 may be integrated with the clamping plate 120 or the force may simply be applied onto the axle 208 by a bottom edge of the clamping plate 120 (e.g., in some instances, no step may be included in the implementation). For instance, the axle-connection region 442 may include a perforation in the clamping plate 120 through which the axle 208, or a portion thereof, may pass. For example, an axle washer 232 may be coupled with the axle at the step 450, or a portion of the axle 208 itself may interact with the step 450.

As described in further detail in reference to FIG. 4D below, in some implementations, various mechanisms may be used at the axle-to-clamping-plate interface or connection region 442 to keep the axle 208 and clamping plate 120 mechanically connected, so that rotational force may be transferred between them. For instance, the hole in the clamping plate 120 that accepts a portion of the axle 208 may have an oval shape, ridged shape, or a flat area (e.g., to be shaped like a D, whether the flat area is large or small), which may prevent them from twisting relative to one another. For instance, where a small flat area is provided or there is an oval shape at the interface, stress risers may be reduced in the plates, which may be particularly beneficial at higher rotations per minute. For example, in some implementations, rather than being bolted through or having a square or other shape with large protrusions, which may increase stress in the flywheel 202, especially where the flywheel 202 is massive or spinning at a high rate, the clamping plate 120 to axle 208 interface may be shaped to induce very little stress into the axle 208 or clamping plate 120 while allowing torque to be transferred.

For example, the axle connection 442 may include various shapes to the pass through that interact with corresponding shapes of the axle 208. The perforation or a portion thereof may be oval shaped, ridged shape (e.g., as in FIG. 6B), or have a flat or "D" shaped area, key, or other shape that allows torque to be transferred between the stacking plate 120 and the axle 208 (e.g., in addition to the torque that may be applied to the axle 208 by its contact with the top/bottom-most stacking plate 122) without significantly increasing material stress at the connection point. In some implementations, this shape may be applied to the entirety of the perforation or only to a portion or step thereof (e.g., as in the illustrated step). This shape may be small, such as a ⅛<sup>th</sup> inch deviation in diameter or a flat section.

Although other implementations are possible, the axle 208 and perforation diameter (e.g., at 442) may be 3-5 inches. For example, a first (e.g., illustrated at a top of the figure) perforation/axle diameter may be 3.75 inches. A second (e.g., illustrated downward from the first) perforation (e.g., step in the perforation)/axle diameter may be 4.25 inches to allow force to be applied from the first diameter onto the axle 208 and then onto the stacking plates 122. In implementations where the second step/perforation/axle portion are oval shaped, the oval may vary from 4.375 inches to 4.250 inches, for example, although other implementations are possible and contemplated herein.

In some implementations, the flat region 444 of the clamping plate 208 may extend outward from the axle connection 442 and provide a location with which the magnetic lift assist member/mechanism 708 may interact to lift the flywheel 202. For instance, the flat region 444 of a top clamping plate 120 may interact with the magnetic field of the magnetic lift assist member 708 to lift the flywheel 202. In some instances, it may additionally or alternatively interact with a bearing. For example, the flywheel 202 may be lifted until the flat region 444 contacts the magnetic lift assist and then lowered slightly to create a gap.

In some implementations, a flat region 444 of a bottom clamping plate 120 may rest on a shipping ring or device when the flywheel 202 is in a shipping position and be lifted off the shipping ring when in an active position. It should be noted that the top clamping plate 120*a* and the bottom clamping plate 120*b* may be the same, or they may be different, such as where the flat portions are sized or shaped to match the shipping ring, magnetic lift assist member 708, or another configuration.

The flat region 444 may have various sizes or configurations. For instance, the flat area 444 may be bounded at a center by a perforation of the axle connection region 442 and may have an outer diameter of various dimensions (e.g., 11 inches). Although various thicknesses of the clamping plate 120 are possible, an example thickness may be approximately one inch (e.g., 0.960 inches) at the flat area/region. For example, in some implementations, most or all of the clamping plate(s) 120 may be flat/a flat region, as noted in reference to FIGS. 4B and 4C.

In some implementations, a clamping plate 120 may have a tapered region 446 between the flat region 444 and an end of a thinner arm 448 that allows the clamping plate 120 to have additional strength near the axle connection 442, the magnetic lift assist area, and/or shipping ring interaction area, for instance, while also having decreased weight and/or increased flexibility nearer the end of the arms/toward an outer radius. The taper may extend partially toward the arms 448, partially into the arms 448, or completely to the end of the arms 448 without departing from the scope of this disclosure.

The shape, size, and configuration taper/tapered region 446 may be based on clamping and centrifugal forces. For instance, the taper may be shaped to balance clamping force while reducing radial stresses due to its mass. It may have various sizes, but as an example, it may have an inner radius matching the outer radius of the flat region, an outer radius of 20 inches (e.g., 20.102 inches). Similarly, the tapered region 446 may begin at the flat region and become thinner as it extends radially outward, for example to a thickness of approximately half an inch, although other dimensions are possible.

In some implementations, the clamping plate 120 may include a plurality of arms 448, which are arranged in a balanced fashion around the axis of rotation. The arms 448 may be defined by scalloped out material in the clamping plate 120, which may be smoothly contoured about an outer edge to reduce high-stress areas, such as those areas that are not well supported for their mass. The scallops or contours of the arms 448 may have a radius of curvature of around 1.750 inches, although other implementations are possible. The illustrated implementation includes eight arms 448 located equidistantly (e.g., at increments of 45-degree angles) around the clamping plate.

In some implementations, a clamping plate 120 may include a bolt area 452 that interfaces with a bolt and/or stacking plate 120 (e.g., at 308). For instance, the bolt area 452 may include a flat or contoured area that is sized and shaped to interact with a bolt head or nut or washers (e.g., Belleville™ washers) associated therewith.

In some implementations, an underside of the clamping plate may include one or more recesses for accepting or retaining bushings. Example bushings, along with the recesses or other structures for holding the bushings are described in further detail in reference to FIGS. 5A and 5B.

For example, one or more bushings may be located at the bolt area 452 and the point of the arm 448 may be shaped based on the configuration of the bushing(s). For example, where two bushings are located to the sides of a bolt hole, the end of the arm 448 may be substantially flat or squared while where a single pushing is located radially inward or radially outward from the bolt hole, the end of the arm may be rounded.

It should be noted that a clamping plate 120 may have various configurations, as described in further detail above. For instance, while a few example implementations are provided herein, numerous variations are possible. For instance, the clamping plate(s) 120 may use any combination of the components described herein or may vary while performing the features described herein.

FIG. 5A illustrates an example bolt 504 and several stacking flywheel plates 122, for example, passing through a contour (e.g., at 308) on an outer edge of the flywheel stacking plates 122. It should be noted that the contour at the clamping location of the stacking plate 122 may be omitted or shaped differently, as noted above. The contour may be convex (e.g., matching a radius of curvature of the stacking plate 122), flat, or concave (e.g., as illustrated). The contour may be based on a position and configuration of the bushing(s) (e.g., as illustrated in FIG. 5B) and/or a stress analysis of the stacking plates 122 and/or bolt 504 at high rotational speeds.

In some implementations, a concave contour may extend only slightly around the bolt 504 and may be replicated in scallops around the stacking plate 122 (e.g., as illustrated in FIG. 3A). In some implementations, a concave contour may extend 180 degrees, 270 degrees or other distances around the bolt 504 (e.g., there may be an enclosed bolt hole, as noted in FIGS. 3B and 3C. In the depicted example, the bolt hole may have a radius of 0.550 inches (e.g., slightly larger than the size of the bolt shaft) and there may be an opening in the bolt hole of 0.188 inches, although these examples may vary by 20-30% and many other possibilities are contemplated. For instance, the contour at the clamping location may omit an outer edge of the bolt hole surrounding material that would be unsupported and prone to failure at high speeds, as illustrated.

As noted above, in some implementations, the bolt shaft may contact the stacking plates 122 around the bolt 504, may not contact the stacking plates 122, or may contact at defined points (e.g., on a radially inward side, a radially outward side, etc.).

As noted elsewhere herein, a bolt 504 may be positioned so that 2,000 to 3,000 pounds of force is on each bolt to create friction on the plates. As noted below in reference to FIG. 5B, a bolt 504 may contact the clamping plate(s) 120 via Belleville™ washers, dish springs, or other washers 506, which may provide some spring in order to continue to apply pressure to the plates when they elongate or become thinner.

For instance, a bolt 504 may not contact the stacking plates 122 unless there is a mechanical failure in the bolt 504 or the stacking plates 122. Where a bolt 504 fails, the contour of the clamping location around the bolt 504 may catch the bolt 504 or fragments thereof. Similarly, where a stacking plate 122 fails, the bolt 504 may catch a stacking plate 122 or portions thereof to mitigate a more catastrophic failure or external damage.

FIG. 5B illustrates cross section of an example bolt 504, an example clamping plate 120, several stacking flywheel plates 122, and a bearing or bushing 512 that applies pressure from the clamping plate 120 on the stacking flywheel plate(s) 122 (e.g., at a peripheral edge, as noted above). In the depicted example, where the flywheel 202 uses stacking plates 122 and separate clamping plates 120, various issues may be caused when the flywheel 202 spins at very high speeds. For example, at high RPMs (rotations per minute), the mass of the stacking plates 122 may cause them to stretch radially while thinning axially. Because some implementations of the clamping plates 120 have less mass at higher radiuses or a lower mass-to-cross section ratio, they may change shape less than the stacking plates 122 at high RPMs. Accordingly, to avoid structural problems, maintain friction among the stacking plates 122, and reduce friction between components that change shaped differently, various mechanisms, such as Belleville™ washers 506, bearings or bushings 512 between clamping and stacking plates, and/or other features. For instance, the bushings may be wear-resistant balls or cylinders.

It should be noted that there may be a space between the clamping plate 120 and the top stacking plate 122 and the stacking plates 122 may each contact one another, which space may be larger during assembly, but the space may shrink as one or more of the clamping plates 120 are tensioned. In the depicted example of FIG. 5B, the clamping plates 120 are in an unstressed position, so that the bearings or bushings 512 are shown unconnected from a top-most stacking plate 122. It should be noted that this space is provided for visibility and that the clamping plate 120 may flex and/or be positioned differently, so that the bearing or bushing 512 contacts the stacking plate 122 and/or there is compression on the Belleville™ washers 506.

Depending on the implementation, an arm of the clamping plate 120 may directly or indirectly (e.g., via a bearing or bushing 512) contact a top/bottom most stacking plate 122. Because the bolts 504 may not allow the clamping plates 120 to move inward as the stacking plates 122 become thinner (although this effect is very small) at high RPMs, spring members, such as Belleville™ or cone washers 506 may be used to provide some flexibility and spring, which feature helps maintain the spacing and/or force between the clamping plate(s) 120 and the stacking plate(s) 122.

Accordingly, the Belleville™ washers 506 may keep a continual force on the plates even while shrinking while spinning. For example, the Belleville™ washers may provide a $1/100,000^{th}$ or $1/10,000^{th}$ flex that accommodates for thinning of the stacking plates 122. Different spring members or washers may be used to increase the flex where thinning is greater at the clamping location, such as where a greater number of stacking plates 122 are used.

Additionally, because the stacking plates 122 may stretch a greater amount than the clamping plates 120 at high RPMs, bearing or bushings 512 or other devices may be used to reduce radial friction between the clamping plates 120 and stacking plates 122 while maintaining clamping force and therefore friction between the stacking plates 122. In some instances, the bearings or bushings 512 may be configured so that rotational friction between the stacking plates 122 and the clamping plates 120 is maintained. It should be noted that although "bushings" are referred to herein, other pivoting or movable structures may be used to allow the plates to expand relative to each other. For example, any device that allows contact while providing the ability to expand differently radially may be used. For example, a small amount (e.g., 5, 8, or 10 thousandths of an inch) of movement may be allowed by the bearing or bushing 512. The movement may be due to rocking, rolling, pivoting, etc.

For example, a bearing or bushing 512 may be a ball, cylinder, wheel, roller, or other piece that allows the stacking plates 122 to move relative to the clamping plates 120. As illustrated in the example of FIG. 5B, the bearing or bushing 512 may be a cylindrical piece of metal; although, it should be noted that other movable pieces that, such as those that roll or pivot back and forth are possible and contemplated herein. For example, a wear resistant metal ball or cylinder may be used.

In some implementations, a bearing or bushing 512 may be partially recessed or otherwise held by a clamping plate 120, such as in a recess, as illustrated in the cross section of FIG. 5B. As example dimensions, the recess may be 0.3 inches in diameter and 0.2 inches deep, so that a ball may extend slightly; although the recess may be rectangular or another shape.

Various quantities, configurations, sizes, or positions of bearings or bushings 512 and bushing holders may be used. For example, as illustrated in the example cross section of FIG. 5B, a single cylindrical bearing or bushing 512 is shown radially inward from the bolt 504. In other implementations, multiple bearings or bushings 512 may be used on each arm and, for instance, located to the sides (e.g., circumferentially) relative to the bolt 504. For example, a single spherical bearing or bushing 512 may be located on each side of a bolt 504 at the clamping area of the clamping plate 120.

It should be noted that other implementations are possible and contemplated herein, such as where no bushings are used, where they are positioned or configured differently, or different mechanisms are used.

Figure 6A:
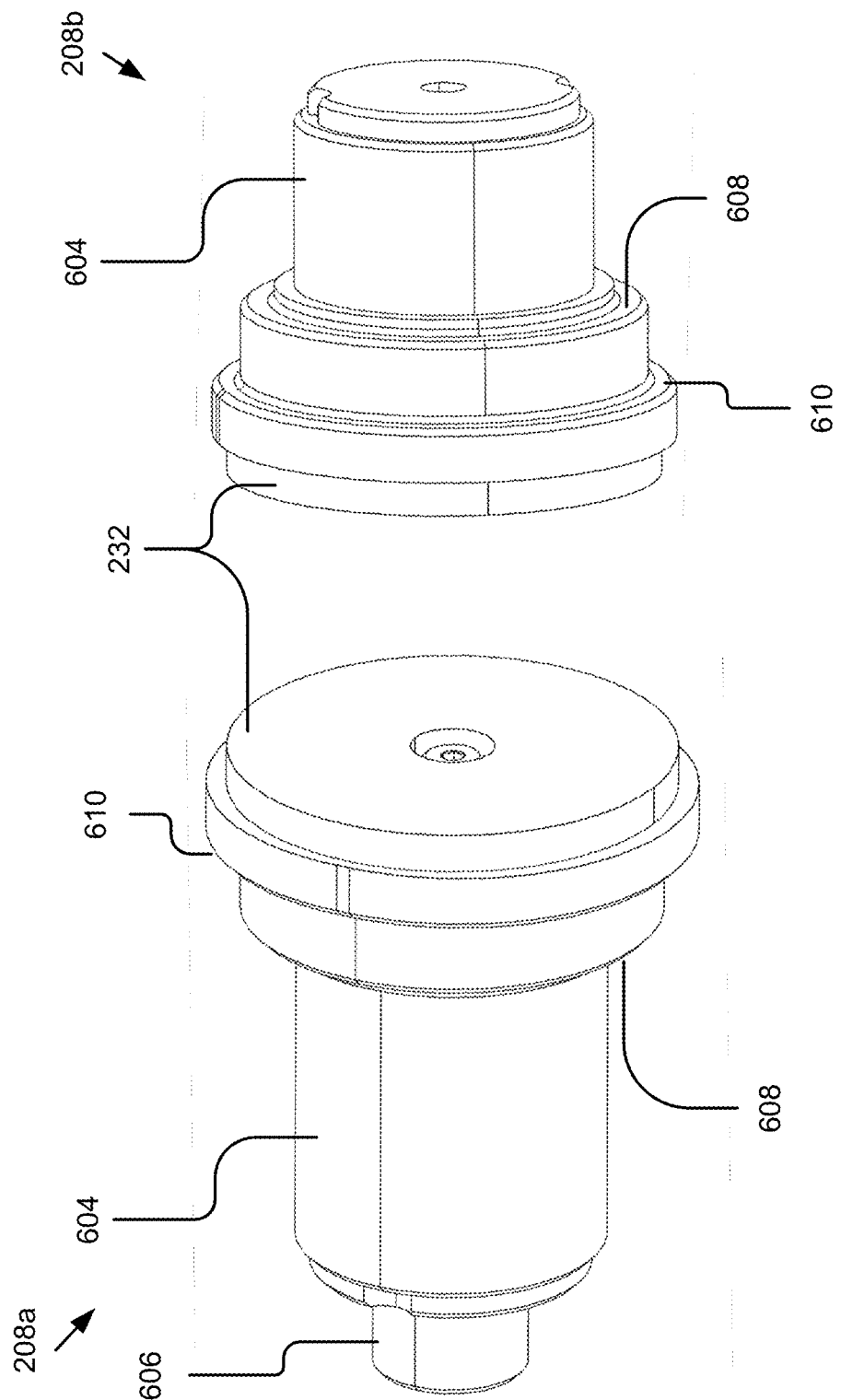
FIGS. 6A and 6B illustrate example flywheel axles.
Figure 6B:
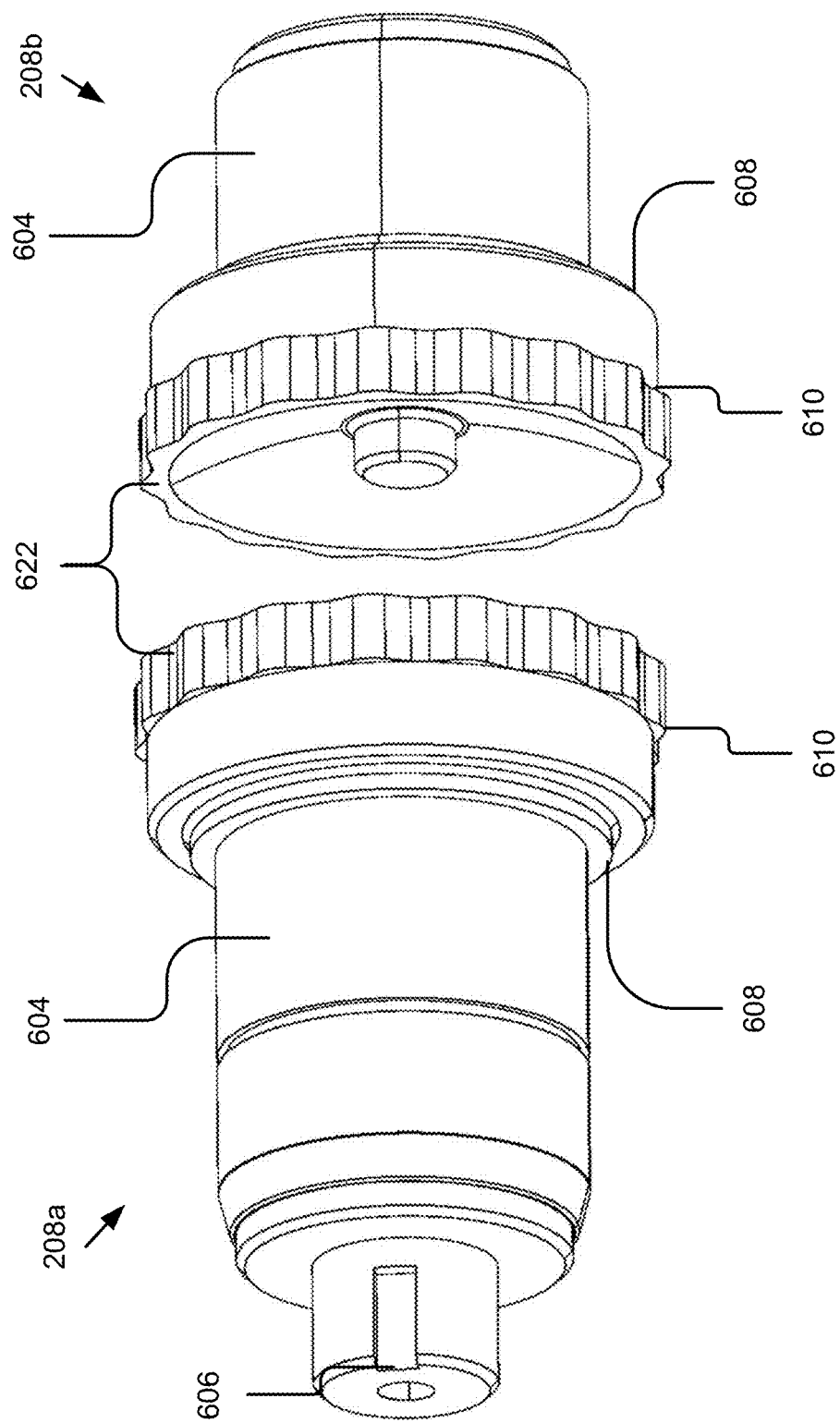

FIGS. 6A and 6B illustrate example flywheel axles 208. Although other sizes and configurations are possible, FIG. 6A illustrates a top and bottom axle 208b with ball washers, and FIG. 6B illustrates another example implementation of a top flywheel axle 208 and a bottom flywheel axle 208. Depending on the implementation, the top and bottom axles 208b may be identical or have variations, such as their length, whether or not they include washers or axle washers 232, whether they include a motor connection 606. Some features of the axle 208 are described in reference to a single one of the top and bottom axle 208b, but they may be present on both or the other axle 208.

Depending on the implementation, as illustrated in FIGS. 6A and 6B, an axle 208 may include a smooth shaft 604 (e.g., a 50-70 mm diameter shaft 604) portion that interacts horizontally with one or more bearings to keep the flywheel 202 aligned. The shaft 604 may contact one or more seals to maintain the vacuum and may be polished to avoid friction with the seals.

An axle 208 may include one or more bearing shelf (ves)/step(s) 608 that interact with bearings to provide vertical support to the flywheel 202 (e.g., to lift, lower, or hold it vertically).

In some implementations, an axle 208 may include one or more clamping shelf (ves)/step(s) 610 that interact with a clamping plate 120. For instance, the clamping step 610 could be a wider area than the shaft 604 so that the clamping plate 120 applies pressure on the clamping step 610 to hold the axle 208. In some implementations, the axle 208 extends beyond the clamping step 610 and clamping flywheel 202, so that the axle 208 applies pressure to a stacking plate 122, as noted above. The contact with a stacking plate 122 may be via a washer, such as an axle ball washer 232. The clamping step 610 may interact with an edge or corresponding step(s) on a clamping plate 120.

In some implementations, the clamping step 610, an axle washer 232, or another part of the axle 208 may be shaped to interact with a corresponding shape or structure in a clamping plate 120. For instance, it may include a flat side, oval shape, protrusion, or other structure that allows torque to be transferred between the axle 208 and the clamping plate 120 and/or stacking plates 122 (e.g., where a top or bottom stacking plate 122 includes a shape to match this structure). For example, as noted in further detail above, an oval or small flat side may be used to avoid stress risers in the material (e.g., of the clamping plate 120).

In some implementations, one or both of the axles 208 may include a motor connection 606 that may be a portion or extension of the shaft 604. The motor connection 606 may include a flat, oval, D-shaped, or other structure/shape (e.g., a key or slot) that allows torque to be transferred between the axle 208 and another structure, such as a motor-generator 110 (e.g., via a magnetic coupling 118, as described above). The motor connection 606 may additionally or alternatively include keys or other protrusions that improve the connection between the axle 208 and another structure (e.g., the magnetic coupling 118, motor-generator 110, etc.).

Although a ball washer (at 232) is illustrated on both the top and bottom axle 208a and 208b in FIG. 6A (also shown in FIG. 2D), other implementations are possible and contemplated. For example, a ball washer may be used to provide a small amount of adjustability to the axle 208 alignment when top axle 208a, bottom axle 208b, stacking plates 122, and clamping plates 120 are aligned, as discussed below. As illustrated in the example, two axles 208 may be used where the axles 208 are physically disconnected from each other.

A ball washer may be flat on its bottom where it contacts a stacking plate 122 while it is rounded on a top where it contacts a corresponding curve in the axle body. Accordingly, the position of the axles 208 could be shifted slightly during assembly to allow the axles 208 to be positioned. As illustrated, in some implementations, a bolt may couple the axle washer to the axle body in order to hold it in place during assembly.

It should be noted that, in some implementations, flat washers or no washers are used with an axle 208.

The example of FIG. 6B is similar to FIG. 6A, but the top axle 208a lacks a washer, for example, the top axle 208a may directly contact a stacking plate 122 (e.g., as illustrated in FIG. 4C) while a bottom axle 208b may have a ball washer (not shown in FIG. 6B). Additionally, in the example, the axle(s) 208 may have a ridged contact area 622, which may correspond to a matching shape on the clamping plate(s) 120, such as the axle connection 442. It should be noted that various other shapes and configurations are possible and contemplated.

Figure 7A:
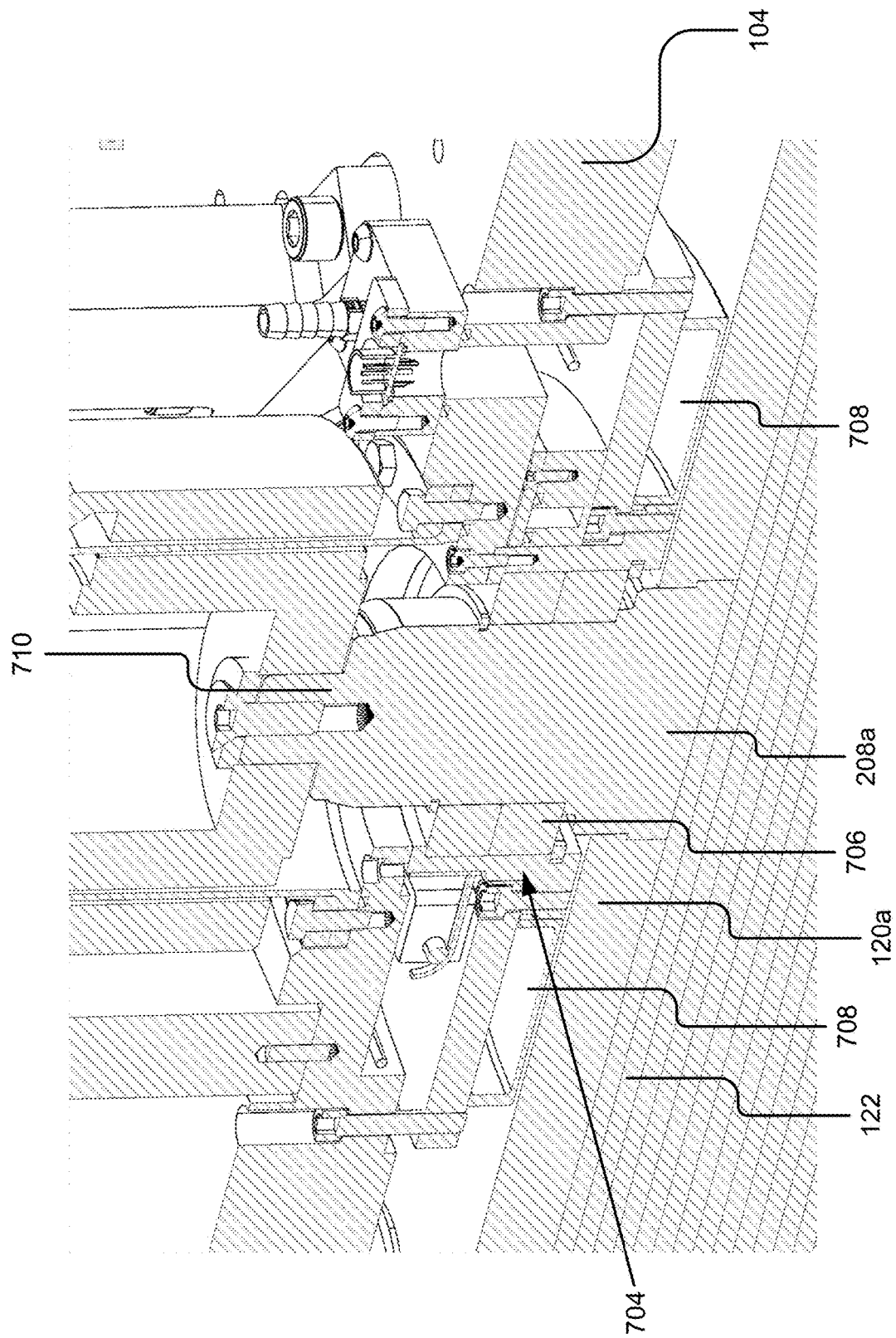
FIG. 7A illustrates a cross-sectional view of an example upper axle disposed within an upper bearing assembly of a flywheel enclosure.

FIG. 7A illustrates a cross-sectional view of an example upper axle 208a disposed within an upper bearing assembly 704 of a flywheel enclosure 104. In the illustrated example, some components may be omitted for visibility. As illustrated, a top axle 208a may interact with a plurality of bearings and/or seals (e.g., at 706) to provide vertical and/or horizontal support. For instance, multiple (e.g., 2) bearing assemblies may be used on an axle 208 to increase redundancy and safety. In some instances, a temperature sensor or accelerometer may be located in or adjacent to the bearing housing, which allows the flywheel 202 to detect a failure of a first bearing thereby increasing a safety margin.

As illustrated, one or multiple seals 706 may be located in or adjacent to the shaft of the axle. For instance, the seals may be housed within a bearing/O-ring housing and contact the smooth sides of the axle shaft to seal a vacuum. In some instances, where the vacuum is actively established or maintained, the seals 706 may change their shape by flexing inward to improve the seal. Similarly, the seals may be multiplied (e.g., doubled) for redundancy.

In some implementations, the bearings and/or seals 706/shaft may be lubricated, for example, using a high durability and/or vacuum specific lubricant. In some implementations, a special material may be used for the seals to allow them to be used in a vacuum and/or without a separate lubricant. Depending on the implementation, the bearings may be dry bearings, such as a ceramic hybrid bearing, which beneficially reduces eddy currents and other issues due to moving in a magnetic field. Additionally, or alternatively, a dry film lubricant may be used for these components.

In some implementations, as illustrated, an example magnetic lift member 708 may interact with (e.g., to attract) a flywheel 202, such as a top clamping plate 120a (and/or stacking plates 122). For instance, as illustrated, the magnet(s) of a magnetic lift member 708 may be located above, below, or next to the center of the axle 208a. For example, the magnets may be positioned by the magnetic lift member 708 (also referred to as the magnetic lift assist member/mechanism 708) to closely interact with the flat area (e.g., 444) of the top clamping plate 120a. For instance, the top bearing 704 may hold the top clamping plate 120a/flywheel 202 at a defined distance from the magnetic lift member 708, so that a defined magnetic force is applied, which lifts the flywheel 202 wholly or partially. For instance, as described elsewhere herein, the magnetic lift may be less than (e.g., so that weight remains on a bottom bearing), equal to (e.g., so that weight is roughly balanced between the top and bottom bearings), or greater than (e.g., so that the top bearing is holding the flywheel 202 from being pulled closer to the magnet(s)) the weight of the flywheel 202 at the set distance.

As illustrated and described in further detail below, the magnetic lift assembly 708 may be positioned close to the clamping plate 120a, which may be ferromagnetic (e.g., a magnetic steel) flat (or matching the shape of the magnetic lift member) shape. As shown, the flywheel 202 may be positioned at a center of the enclosure 104, although other implementations are possible. As noted elsewhere herein, the magnets of the magnetic lift mechanism 708/member may be stationary and coupled with the enclosure because magnets tend to be made out of weaker material that would not hold up well to rapid spinning (e.g., because rare-earth magnets, for instance, are mechanically weak).

In the depicted example, a motor coupling 710 is also illustrated. The motor coupling 710 may be direct to a motor-generator 110 or via a magnetic coupling, clutch, transmission, or other device.

Figure 7B:
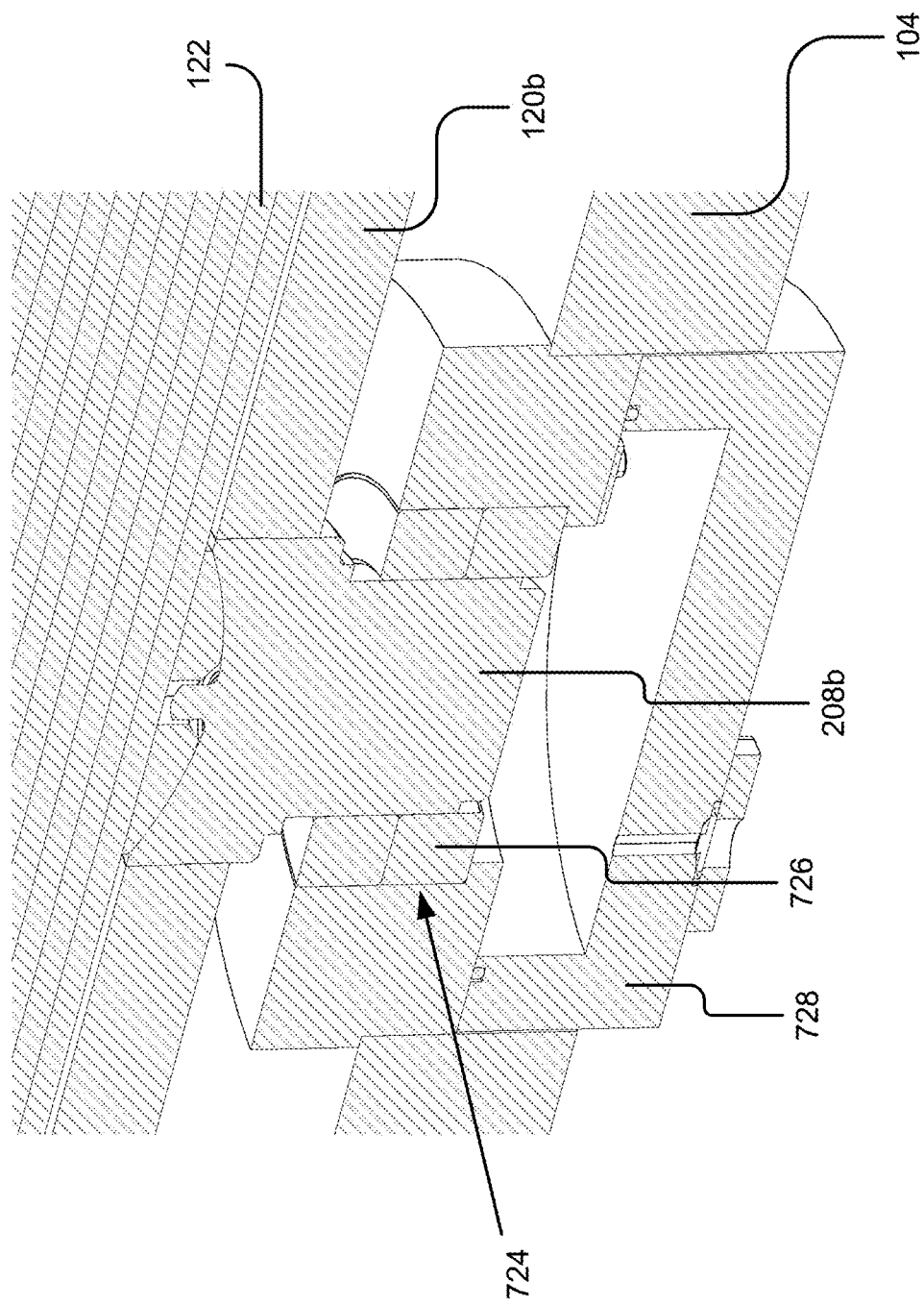
FIG. 7B illustrates a cross-sectional view of an example lower axle disposed within a lower bearing assembly of a flywheel enclosure.

FIG. 7B illustrates a cross-sectional view of an example lower axle 208b disposed within a lower bearing assembly 724 of a flywheel enclosure 104. In the illustrated example, some components may be omitted for visibility. Similar to FIG. 7A, as illustrated, a bottom axle 208b may interact with a plurality of bearings and/or seals (e.g., at 726) to provide vertical and/or horizontal support. For instance, multiple (e.g., 2) bearing assemblies may be used on an axle 208 to increase redundancy and safety. In some instances, a temperature sensor or accelerometer may be located in or adjacent to the bearing housing, which allows the flywheel 202 to detect a failure of a first bearing thereby increasing a safety margin. Stacking plates 122 are also shown.

As shown in the example of 7B, a cap 728 is also shown. The cap 728 may seal (e.g., using gaskets and bolts) an interior cavity of the enclosure 104. The cap 728 may provide access to move the flywheel 202 within the enclosure 104; install, maintain, or adjust bearings and seals; and perform other actions.

In some implementations, the cap 728 and/or another component may be threaded, so that it may be twisted up/down, which adjusts the position of the bearings 724 and/or seals 726; or it may lift the flywheel 202 itself to set its position in the enclosure 104.

Figure 7C:
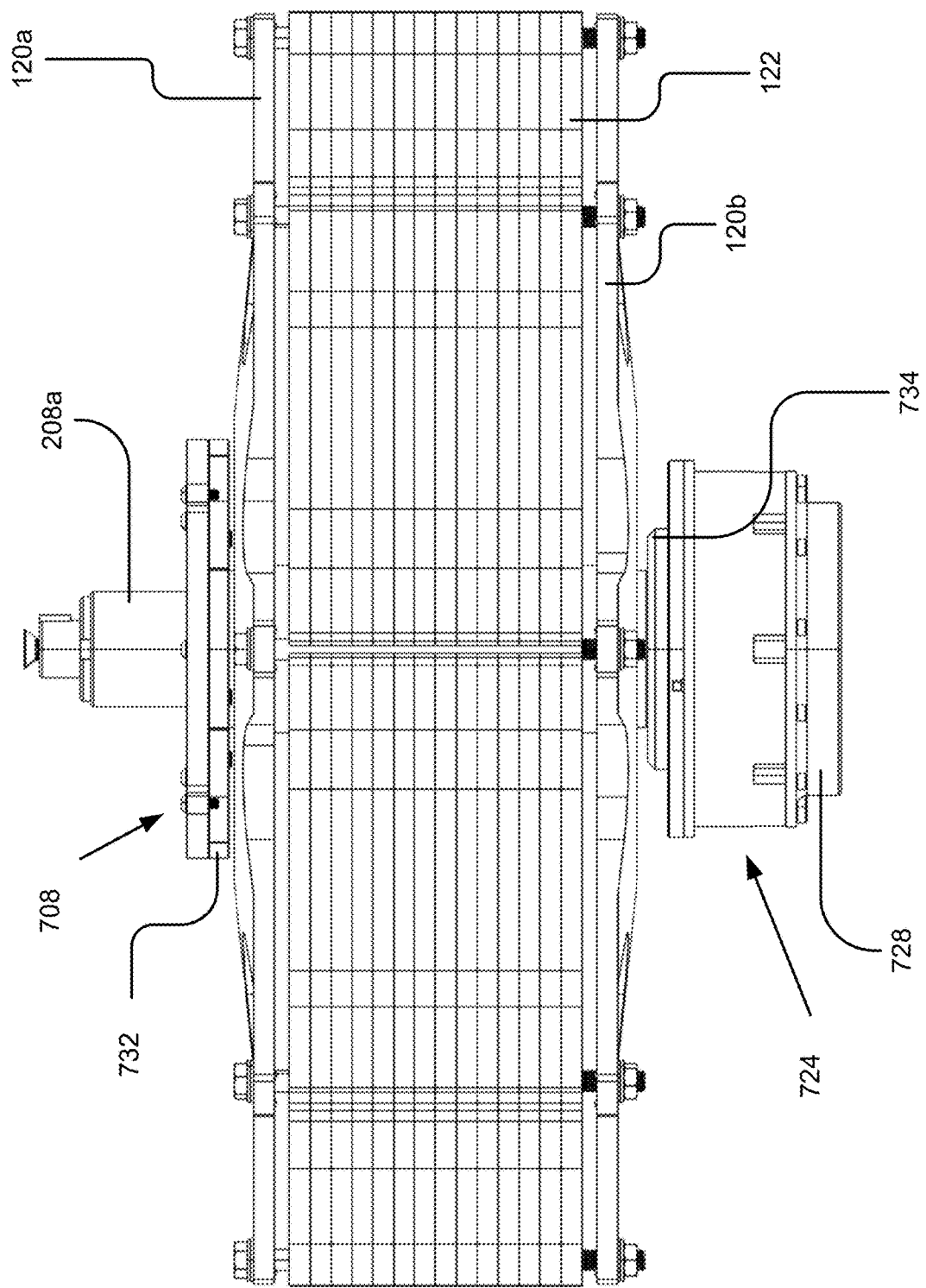
FIG. 7C illustrates an example flywheel coupled with components of the upper and lower bearing assemblies outside of a flywheel enclosure.

FIG. 7C illustrates an example flywheel 202 coupled with components of the upper and lower bearing assemblies outside of a flywheel enclosure, for example, for purposes of illustration.

As illustrated in the example of FIG. 7C, the exterior of the magnetic lift member 708 has been omitted to show magnets 732, which may be wedge magnets, and an example relative proximity to the top clamping plate 120a. For instance, the wedge magnets 732 may, when in an active configuration, pull on the flat area of the clamping plate 120a, although other implementations are possible and contemplated. It should be noted that although the magnets 732 and other components of the magnetic lift member 708 are illustrated floating above the top clamping plate 120a (e.g., instead of attached to an enclosure 104/lid 128) for purposes of illustration.

The example of FIG. 7C also illustrates a lower bearing assembly 724 that holds one or more bearings at the bottom of the flywheel enclosure 104. For instance, a lower bearing assembly 724 may be welded, integrated with, or bolted to an enclosure tub 126. The lower bearing 724 may support none, a portion, or all of the weight of the flywheel 202. In some implementations, the lower bearing 724 may merely be present to keep the flywheel 202 horizontally aligned.

The lower bearing 724 may include a shipping support area 734, such as a shipping ring, on which the weight of the flywheel 202 may rest during shipping, storage, or when not in use. The shipping support area 734 may be any device that may support the flywheel 202, such as a plastic or metal ring in the enclosure tub 126.

The height and/or relative positioning of the bearings may also be adjusted because a quantity (e.g., 10, 14, 18, 28, or other quantities) of stacking plates 122 may vary, and thicknesses of each plate may vary (e.g., by a thousandth of an inch), the overall thickness of the flywheel 202 may vary enough to affect the functioning or longevity of the bearings unless there is flexibility in the design, as illustrated, to accommodate different heights.

As described elsewhere herein, a retaining cap 728 or another mechanism may seal the enclosure and/or capture an adjustment nut so that it does not accidentally move in order to lock the Z/vertical axis of the flywheel 202.

In the foregoing description, for purposes of explanation, numerous specific details are set forth in order to provide a thorough understanding of the technology. It will be apparent, however, that the technology described herein can be practiced without these specific details.

Reference in the specification to "one implementation", "an implementation", "some implementations", or "other implementations" means that a particular feature, structure, or characteristic described in connection with the implementation is included in at least one implementation of the disclosure. The appearances of the term "implementation" or "implementations" in various places in the specification are not necessarily all referring to the same implementation.

In addition, it should be understood and appreciated that variations, combinations, and equivalents of the specific implementations, implementations, and examples may exist, are contemplated, and are encompassed hereby. The invention should therefore not be limited by the above-described implementations, implementations, and examples, but by all implementations, implementations, and examples, and other equivalents within the scope and spirit of the invention as claimed.

What is claimed is:

1. A flywheel comprising:
one or more flywheel plates;
two or more clamping plates including a bottom clamping plate and a top clamping plate, the one or more flywheel plates being located between the two or more clamping plates;
two or more axles including a top axle and a bottom axle, the bottom axle being physically disconnected from the top axle, the bottom axle extending through a perforation in a center of the bottom clamping plate; and
a plurality of fasteners coupling the top clamping plate with the bottom clamping plate, the plurality of fasteners applying a clamping force on the one or more flywheel-plates using at least one of the two or more clamping plates and the two or more axles, the bottom clamping plate applying the clamping force to the one or more flywheel plates via the bottom axle.

2. The flywheel of claim 1, wherein the one or more flywheel-plates include a plurality of flat plates having a substantially circular shape, the plurality of flat plates being held together using the clamping force.

3. The flywheel of claim 1, wherein the bottom axle includes a flat surface that applies the clamping force to a flat surface of a bottom-most flywheel-plate of the one or more flywheel plates.

4. The flywheel of claim 1, wherein:
the plurality of fasteners include a plurality of bolts drawing the top clamping plate toward the bottom clamping plate; and
the clamping force is applied at a center of the one or more flywheel plates via at least one of the two or more axles.

5. The flywheel of claim 4, wherein:
the clamping force is applied proximate to a peripheral edge of the one or more flywheel-plates via one or more contact points between the bottom clamping plate and the one or more flywheel plates; and
the flywheel includes a space between the bottom clamping plate and the one or more flywheel plates, the space being located radially outward from the bottom axle.

6. The flywheel of claim 5, wherein:
the one or more contact points include one or more of a bearing and a bushing that allows the bottom clamping plate to move radially relative to the one or more flywheel-plates.

7. The flywheel of claim 1, wherein the bottom clamping plate includes:
a plurality of arms coupled together at a center of the bottom clamping plate, the center having an axle connection point for the bottom axle, the plurality of arms extending radially from the center to a plurality of arm ends; each of the plurality of arm ends including a connection point coupled with a fastener of the plurality of fasteners.

8. The flywheel of claim 1, wherein:
at least one of the two or more clamping plates include a plurality of perforations, the plurality of perforations receiving the plurality of fasteners, the plurality of fasteners being fewer than the plurality of perforations when the flywheel is fully assembled.

9. The flywheel of claim 1, wherein a radius of the two or more clamping plates is less than a radius of the one or more flywheel plates.

10. The flywheel of claim 9, wherein the one or more flywheel plates include a plurality of perforations for the plurality of fasteners; the two or more axles being located at an axis of rotation of the flywheel, the one or more flywheel-plates lacking a perforation for the two or more axles at the axis of rotation.

11. The flywheel of claim 1, wherein the plurality of fasteners includes a plurality of bolts that are perpendicular to a radial direction of the flywheel and angled relative to an axial direction of the flywheel.

12. The flywheel of claim 11, wherein a first of the plurality of bolts is at a first angle and a second of the plurality of bolts is at a second angle relative to the axial direction of the flywheel, the second angle being different from the first angle.

13. The flywheel of claim 1, wherein the one or more flywheel-plates include a plurality of contours at a peripheral edge of the one or more flywheel-plates.

14. The flywheel of claim 13, wherein the one or more flywheel plates lack any perforations.

15. A mechanical-energy storage unit comprising:
an enclosure;
a motor coupled with one or more of a top axle and a bottom axle;
a top bearing coupling the enclosure with the top axle;
a bottom bearing coupling the enclosure with the bottom axle; and
a flywheel inside the enclosure including:
one or more flywheel plates;
two or more clamping plates including a bottom clamping plate and a top clamping plate, the one or more flywheel plates being located between the two or more clamping plates;
two or more axles including the top axle and the bottom axle, the bottom axle being physically disconnected from the top axle, wherein the bottom axle includes a flat surface that applies a clamping force to a flat surface of a bottom-most flywheel plate of the one or more flywheel plates; and
a plurality of fasteners coupling the top clamping plate with the bottom clamping plate, the plurality of fasteners applying the clamping force on the one or more flywheel plates using at least one of the two or more clamping plates and the two or more axles.

16. The mechanical-energy storage unit of claim 15, wherein the one or more flywheel plates include a plurality of flat plates having a substantially circular shape held together using the clamping force.

17. The mechanical-energy storage unit of claim 15, wherein:
the bottom axle extends through a perforation in a center of the bottom clamping plate, the bottom clamping plate applying the clamping force to the one or more flywheel plates via the bottom axle.

18. A system comprising:
an enclosure including a tub and a lid;
a top bearing coupled with the lid and a top axle;
a bottom bearing coupled with the enclosure and a bottom axle;
a motor coupled with the lid via a mounting brace, the motor being coupled with the top axle;
a flywheel inside the enclosure; the flywheel including:
one or more flywheel plates;
two or more clamping plates including a bottom clamping plate and a top clamping plate, the one or more flywheel plates being located between the two or more clamping plates;
two or more axles including the top axle and the bottom axle, the bottom axle being physically disconnected from the top axle; and
a plurality of fasteners coupling the top clamping plate with the bottom clamping plate, the plurality of fasteners applying a clamping force on the one or more flywheel plates using at least one of the two or more clamping plates and the two or more axles, wherein:
the clamping force is applied proximate to a peripheral edge of the one or more flywheel plates via one or more contact points between the bottom clamping plate and the one or more flywheel plates, and
the flywheel includes a space between the bottom clamping plate and the one or more flywheel plates, the space being located radially outward from the bottom axle; and
a magnet coupled with the lid and attracting the top clamping plate of the flywheel.

19. A system comprising:
one or more flywheel plates;
two or more clamping plates including a bottom clamping plate and a top clamping plate, the one or more flywheel plates being located between the two or more clamping plates;
two or more axles including a top axle and a bottom axle, the bottom axle being physically disconnected from the top axle; and
a plurality of fasteners coupling the top clamping plate with the bottom clamping plate, the plurality of fasteners applying a clamping force on the one or more flywheel plates using at least one of the two or more clamping plates and the two or more axles, wherein:
the plurality of fasteners includes a plurality of bolts drawing the top clamping plate toward the bottom clamping plate, and
the clamping force is applied at a center of the one or more flywheel plates via at least one of the two or more axles.

20. The system of claim 19, wherein:
the clamping force is applied proximate to a peripheral edge of the one or more flywheel plates via one or more contact points between the bottom clamping plate and the one or more flywheel plates; and the system includes a space between the bottom clamping plate and the one or more flywheel plates, the space being located radially outward from the bottom axle.

21. The system of claim 20, wherein:

the one or more contact points include one or more of a bearing and a bushing that allows the bottom clamping plate to move radially relative to the one or more flywheel plates.

22. A flywheel comprising:

one or more flywheel plates;

two or more clamping plates including a bottom clamping plate and a top clamping plate, the one or more flywheel plates being located between the two or more clamping plates;

two or more axles including a top axle and a bottom axle, the bottom axle being physically disconnected from the top axle; and a plurality of fasteners coupling the top clamping plate with the bottom clamping plate, the plurality of fasteners applying a clamping force on the one or more flywheel plates using at least one of the two or more clamping plates and the two or more axles, wherein the plurality of fasteners includes a plurality of bolts that are perpendicular to a radial direction of the flywheel and angled relative to an axial direction of the flywheel.

23. The flywheel of claim 22, wherein a first of the plurality of bolts is at a first angle and a second of the plurality of bolts is at a second angle relative to the axial direction of the flywheel, the second angle being different from the first angle.

* * * * *